(12) United States Patent
Seo et al.

(10) Patent No.: US 11,259,003 B2
(45) Date of Patent: Feb. 22, 2022

(54) APPARATUS AND METHOD FOR PROVIDING 3-DIMENSIONAL AROUND VIEW THROUGH A USER INTERFACE MODULE INCLUDED IN A VEHICLE

(71) Applicant: LG Electronics Inc., Seoul (KR)

(72) Inventors: Jeong Hyeon Seo, Gyeonggi-do (KR); Sang Hoon Kim, Seoul (KR); Jin Seok Im, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 219 days.

(21) Appl. No.: 16/559,170

(22) Filed: Sep. 3, 2019

(65) Prior Publication Data
US 2020/0007844 A1 Jan. 2, 2020

(30) Foreign Application Priority Data

Jul. 11, 2019 (KR) .................. 10-2019-0083719

(51) Int. Cl.
*H04N 13/156* (2018.01)
*H04N 13/243* (2018.01)
(Continued)

(52) U.S. Cl.
CPC ............. *H04N 13/156* (2018.05); *B60R 1/00* (2013.01); *G05D 1/0231* (2013.01); *G06T 7/13* (2017.01); *G06T 7/174* (2017.01); *G06T 7/30* (2017.01); *G06T 7/55* (2017.01); *H04N 13/128* (2018.05); *H04N 13/133* (2018.05);
(Continued)

(58) Field of Classification Search
CPC ................ B60R 1/00; B60R 2300/105; B60R 2300/205; B60R 2300/303; G05D 1/0231; G05D 2201/0213; G06T 2207/10028; G06T 2207/20084; G06T 2207/30252; G06T 3/4038; G06T 7/13; G06T 7/174; G06T 7/30; G06T 7/55; H04N 13/128; H04N 13/133; H04N 13/156; H04N 13/243;
(Continued)

(56) References Cited

U.S. PATENT DOCUMENTS

2017/0109940 A1* 4/2017 Guo ................... G06T 19/20
2017/0148168 A1* 5/2017 Lindner ............... G06T 5/50
2019/0295282 A1* 9/2019 Smolyanskiy ........ G01S 13/867

FOREIGN PATENT DOCUMENTS

KR 1020170019793 2/2017

* cited by examiner

*Primary Examiner* — Jessica M Prince
(74) *Attorney, Agent, or Firm* — Fish & Richardson P.C.

(57) ABSTRACT

A three-dimensional around view providing apparatus for providing a 3D around view through a user interface module included in a vehicle may include a plurality of image pickup units mounted in the vehicle, a depth estimator configured to receive a plurality of images from the plurality of image pickup units and to acquire a plurality of depth maps corresponding to the plurality of images, a controller configured to minimize a depth difference between a first boundary region of a first depth map and a second boundary region of a second depth map. At least one among an autonomous vehicle, a user terminal, and a server according to embodiments of the present disclosure may be associated or integrated with an artificial intelligence (AI) module, a drone (unmanned aerial vehicle (UAV)), a robot, an augmented reality (AR) device, a virtual reality (VR) device, a 5th-generation (5G) service related device, and the like.

18 Claims, 11 Drawing Sheets

(51) Int. Cl.
*H04N 13/128* (2018.01)
*G06T 7/55* (2017.01)
*H04N 13/133* (2018.01)
*G06T 7/174* (2017.01)
*G06T 7/13* (2017.01)
*G06T 7/30* (2017.01)
*B60R 1/00* (2022.01)
*G05D 1/02* (2020.01)
*H04N 13/271* (2018.01)
*H04W 72/14* (2009.01)
*H04W 84/04* (2009.01)

(52) U.S. Cl.
CPC ......... *H04N 13/243* (2018.05); *H04N 13/271* (2018.05); *B60R 2300/105* (2013.01); *B60R 2300/303* (2013.01); *G05D 2201/0213* (2013.01); *G06T 2207/10028* (2013.01); *G06T 2207/20084* (2013.01); *G06T 2207/30252* (2013.01); *H04W 72/14* (2013.01); *H04W 84/042* (2013.01)

(58) Field of Classification Search
CPC ............... H04N 13/254; H04N 13/271; H04N 2013/0081; H04W 72/14; H04W 84/042
See application file for complete search history.

APPARATUS AND METHOD FOR PROVIDING 3-DIMENSIONAL AROUND VIEW THROUGH A USER INTERFACE MODULE INCLUDED IN A VEHICLE

CROSS-REFERENCE TO RELATED APPLICATION

This application claims benefit of priority to Korean Patent Application No. 10-2019-0083719, filed on Jul. 11, 2019, the entire disclosure of which is incorporated herein by reference in its entirety.

BACKGROUND

1. Technical Field

The present disclosure relates to a driver assistance system, in particular, a three-dimensional (3D) around view providing apparatus and method for generating an around view image by using camera images around a vehicle.

2. Description of Related Art

Advanced driver assistance systems (ADAS) are being actively developed, as user requirements for vehicles increase. One of various ADAS technologies is an around view monitoring (AVM) technology of generating an around view image by using camera images around a vehicle during parking.

The AVM technology is a technology of providing an image as if looking down from above a vehicle by installing four cameras on the front, the rear, and both side-view mirrors of the vehicle, respectively, and then synthesizing images captured by the cameras, and is called a top view or a bird's-eye view.

The AVM technology allows a user of the vehicle to check surroundings of the vehicle by using a top view image viewed from above the vehicle. However, since an image has distortion in the AVM technology of generating a top view image by using only an existing camera, it is impossible for the user to accurately analyze an object around the vehicle.

One of conventional methods for correcting distortion of an image for the above-described situation is a method of generating a top view image by stereoscopy of camera images by using a distance measured by a distance measuring unit for measuring a distance between a vehicle and a surrounding environment, as disclosed in Korean Patent Application Publication No. 10-2017-0019793 (hereinafter referred to as "Related Art 1").

However, in the above-described conventional method of correcting an image distortion disclosed in Related Art 1, since a distance is measured by using an expensive sensor such as a light detection and ranging (lidar) sensor, or a 3D camera, costs required for hardware may increase. Also, since camera images are converted for stereo imaging based on an incomplete 3D model (3D Cue), an image with severe artifact such as a depth reversal phenomenon, and the like, is provided.

For this reason, as well as a cost issue due to installation of an expensive sensor, it is unnatural for a user to see the image with the naked eye due to artifact in the image, which causes eye fatigue.

Thus, there is a demand for a technology of providing a natural 3D image as an around view image even though an expensive sensor is not installed.

SUMMARY OF THE INVENTION

The present disclosure is directed to providing a three-dimensional (3D) around view providing apparatus and method which may enhance a structure of using an expensive sensor that is the cause of the above-described problems and may generate a 3D top view by using only images acquired by cameras.

The present disclosure is directed to providing a 3D around view providing apparatus and method which may convert a two-dimensional (2D) image into a 3D image by using a deep learning-based technology, instead of using an incomplete 3D model in which artifacts occur.

It will be appreciated by those skilled in the art that aspects to be achieved by the present disclosure are not limited to what has been disclosed hereinabove, and other aspects will be more clearly understood from the following detailed description below.

A 3D around view providing apparatus according to an embodiment of the present disclosure may be configured to acquire a plurality of depth maps corresponding to a plurality of images, and to connect the images by matching boundaries of the plurality of acquired depth maps, so as to generate a natural around view image.

Specifically, in an embodiment of the present disclosure, a 3D around view providing apparatus for providing a 3D around view through a user interface module included in a vehicle may include a plurality of image pickup units mounted in the vehicle, a depth estimator configured to receive a plurality of images from the plurality of image pickup units and to acquire a plurality of depth maps corresponding to the plurality of images, an image processor configured to minimize a depth difference between a first boundary region of a first depth map and a second boundary region of a second depth map, to acquire a first around view depth map with the minimized depth difference between the first boundary region and the second boundary region, and to restore a 3D around view image for the plurality of images by using the first around view depth map, the first boundary region and the second boundary region being boundary regions in which the first depth map and the second depth map, which are adjacent to each other among the plurality of depth maps, overlap, and a display unit configured to display the 3D around view image.

The depth estimator may acquire the plurality of depth maps corresponding to the plurality of images by inputting the plurality of images to a deep neural network (DNN) encoder.

The controller may determine the first boundary region and the second boundary region in which the first depth map and the second depth map overlap, based on locations in which the plurality of image pickup units is mounted.

The controller may minimize the depth difference between the first boundary region and the second boundary region by using a function that minimizes a Euclidean distance between first boundary region 3D coordinate values calculated by a depth value in the first boundary region and second boundary region 3D coordinate values calculated by a depth value in the second boundary region.

The first boundary region 3D coordinate values may be 3D coordinate values set to correspond to a focal length and a principal point of each of the image pickup units, based on the depth value in the first boundary region and first boundary region 2D coordinate values, and the second boundary region 3D coordinate values may be 3D coordinate values set to correspond to a focal length and a principal point of each of the image pickup units, based on the depth value in the second boundary region and second boundary region 2D coordinate values.

The controller may minimize a depth difference between a third boundary region of a third depth map and a fourth boundary region of the first depth map, may acquire a second around view depth map with the minimized depth difference between the first boundary region and the second boundary region and the minimized depth difference between the third boundary region and the fourth boundary region, and may restore a 3D around view image for the plurality of images by using the second around view depth map. The third boundary region and the fourth boundary region may be boundary regions in which the third depth map and the first depth map among the plurality of depth maps overlap. One side of the first depth map may overlap the second depth map, and the other side of the first depth map may overlap the third depth map.

The controller may calculate a first linear function that minimizes a Euclidean distance between first boundary region 3D coordinate values calculated by a depth value in the first boundary region and second boundary region 3D coordinate values calculated by a depth value in the second boundary region, and a second linear function that minimizes a Euclidean distance between third boundary region 3D coordinate values calculated by a depth value in the third boundary region and fourth boundary region 3D coordinate values calculated by a depth value in the fourth boundary region, and may minimize the depth difference between the first boundary region and the second boundary region and the depth difference between the third boundary region and the fourth boundary region by using a final linear function having a coefficient and a constant which are respectively equal to an average of coefficients of the first linear function and the second linear function and an average of constants of the first linear function and the second linear function.

The first boundary region 3D coordinate values may be 3D coordinate values set to correspond to a focal length and a principal point of each of the image pickup units, based on the depth value in the first boundary region and first boundary region 2D coordinate values, and the second boundary region 3D coordinate values may be 3D coordinate values set to correspond to a focal length and a principal point of each of the image pickup units, based on the depth value in the second boundary region and second boundary region 2D coordinate values. The third boundary region 3D coordinate values may be 3D coordinate values set to correspond to a focal length and a principal point of each of the image pickup units, based on the depth value in the third boundary region and third boundary region 2D coordinate values, and the fourth boundary region 3D coordinate values may be 3D coordinate values set to correspond to a focal length and a principal point of each of the image pickup units, based on the depth value in the fourth boundary region and fourth boundary region 2D coordinate values.

The 3D around view providing apparatus may further include an operator configured to control an operation of an autonomous driving mode of the vehicle, and a communicator configured to receive DNN data based on a downlink (DL) grant of a 5th-generation (5G) network connected to allow the vehicle to operate in the autonomous driving mode. The depth estimator may update the DNN encoder based on the DNN data received from the communicator.

In an embodiment of the present disclosure, a 3D around view providing method of providing a 3D around view through a user interface module included in a vehicle may include receiving a plurality of images through an image pickup unit, acquiring a plurality of depth maps corresponding to the plurality of images, minimizing a depth difference between a first boundary region of a first depth map and a second boundary region of a second depth map, the first boundary region and the second boundary region being boundary regions in which the first depth map and the second depth map, which are adjacent to each other among the plurality of depth maps, overlap, acquiring a first around view depth map with the minimized depth difference between the first boundary region and the second boundary region, restoring a 3D around view image for the plurality of images by using the first around view depth map, and displaying the 3D around view image.

The acquiring the plurality of depth maps may include acquiring the plurality of depth maps corresponding to the plurality of images by inputting the plurality of images to a DNN encoder.

The minimizing the depth difference between the first boundary region and the second boundary region may include determining the first boundary region and the second boundary region in which the first depth map and the second depth map overlap, based on a location where the image pickup unit is mounted on the vehicle.

The minimizing the depth difference between the first boundary region and the second boundary region may include minimizing the depth difference between the first boundary region and the second boundary region by using a function that minimizes a Euclidean distance between first boundary region 3D coordinate values calculated by a depth value in the first boundary region and second boundary region 3D coordinate values calculated by a depth value in the second boundary region.

The first boundary region 3D coordinate values may be 3D coordinate values set to correspond to a focal length and a principal point of the image pickup unit, based on the depth value in the first boundary region and first boundary region 2D coordinate values, and the second boundary region 3D coordinate values may be 3D coordinate values set to correspond to the focal length and the principal point of the image pickup unit, based on the depth value in the second boundary region and second boundary region 2D coordinate values.

The minimizing the depth difference between the first boundary region and the second boundary region may include minimizing a depth difference between a third boundary region of a third depth map and a fourth boundary region of the first depth map, and the third boundary region and the fourth boundary region may be boundary regions in which the third depth map and the first depth map among the plurality of depth maps overlap. The acquiring the first around view depth map may include acquiring a second around view depth map with the minimized depth difference between the first boundary region and the second boundary region and the minimized depth difference between the third boundary region and the fourth boundary region. One side of the first depth map may overlap the second depth map, and the other side of the first depth map may overlap the third depth map.

The minimizing the depth difference between the third boundary region and the fourth boundary region may include calculating a first linear function that minimizes a Euclidean distance between first boundary region 3D coordinate values calculated by a depth value in the first boundary region and second boundary region 3D coordinate values calculated by a depth value in the second boundary region, and a second linear function that minimizes a Euclidean distance between third boundary region 3D coordinate values calculated by a depth value in the third boundary region and fourth boundary region 3D coordinate values calculated by a depth value in the fourth boundary region, and minimizing the depth difference between the first boundary region and the second boundary region and the depth difference between the third boundary region and the fourth boundary region by using a final linear function having a coefficient and a constant which are respectively equal to an average of coefficients of the first linear function and the second linear function and an average of constants of the first linear function and the second linear function.

The first boundary region 3D coordinate values may be 3D coordinate values set to correspond to a focal length and a principal point of the image pickup unit, based on the depth value in the first boundary region and first boundary region 2D coordinate values, and the second boundary region 3D coordinate values may be 3D coordinate values set to correspond to a focal length and a principal point of the image pickup unit, based on the depth value in the second boundary region and second boundary region 2D coordinate values. The third boundary region 3D coordinate values may be 3D coordinate values set to correspond to a focal length and a principal point of the image pickup unit, based on the depth value in the third boundary region and third boundary region 2D coordinate values, and the fourth boundary region 3D coordinate values may be 3D coordinate values set to correspond to a focal length and a principal point of the image pickup unit, based on the depth value in the fourth boundary region and fourth boundary region 2D coordinate values.

In an embodiment of the present disclosure, a computer-readable recording medium for recording a program to provide a 3D around view to a user of a vehicle may include a first means configured to receive a plurality of images through an image pickup unit, a second means configured to acquire a plurality of depth maps corresponding to the plurality of images, a third means configured to minimize a depth difference between a first boundary region of a first depth map and a second boundary region of a second depth map, the first boundary region and the second boundary region being boundary regions in which the first depth map and the second depth map, which are adjacent to each other among the plurality of depth maps, overlap, a fourth means configured to acquire an around view depth map with the minimized depth difference between the first boundary region and the second boundary region, a fifth means configured to restore a 3D around view image for the plurality of images by using the around view depth map, and a sixth means configured to display the 3D around view image.

Details of other embodiments will be included in the detailed description and the drawings.

According to embodiments of the present disclosure, a 3D top view may be generated even in the case in which only a general vehicle camera is installed, and thus it is possible to provide an around view function even in a vehicle in which an expensive sensor is not installed.

According to embodiments of the present disclosure, a 2D image may be converted into a 3D image by using a deep learning model that is trained based on an actual image database, and thus it is possible to provide a natural image similar to reality.

BRIEF DESCRIPTION OF THE DRAWINGS

The foregoing and other aspects, features, and advantages of the invention, as well as the following detailed description of the embodiments, will be better understood when read in conjunction with the accompanying drawings. For the purpose of illustrating the present disclosure, there is shown in the drawings an exemplary embodiment, it being understood, however, that the present disclosure is not intended to be limited to the details shown because various modifications and structural changes may be made therein without departing from the spirit of the present disclosure and within the scope and range of equivalents of the claims. The use of the same reference numerals or symbols in different drawings indicates similar or identical items.

DETAILED DESCRIPTION

Figure 1:
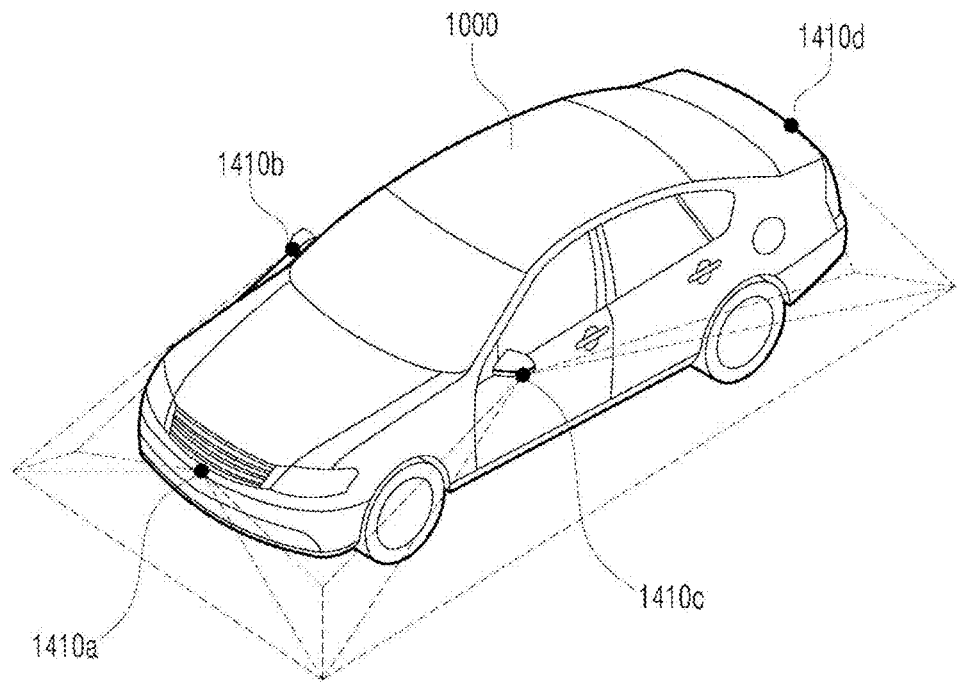
FIG. 1 is a diagram illustrating a vehicle to which a three-dimensional (3D) around view providing apparatus is applied according to an embodiment of the present disclosure.

Advantages and features of the present disclosure and methods for achieving them will become apparent from the descriptions of aspects herein below with reference to the accompanying drawings. However, the present disclosure is not limited to the aspects disclosed herein but may be implemented in various different forms. The terms "module" and "unit or portion" for elements used in the following description are merely provided for facilitation of preparing this specification, and thus they are not granted a specific meaning or function. In the following description of the embodiments disclosed herein, the detailed description of related known technology will be omitted when it may obscure the subject matter of the embodiments according to the present disclosure. The accompanying drawings are merely used to help easily understand embodiments of the present disclosure, and it should be understood that the technical idea of the present disclosure is not limited by the accompanying drawings, and these embodiments include all changes, equivalents or alternatives within the idea and the technical scope of the present disclosure.

Although the terms first, second, third, and the like, may be used herein to describe various elements, components, regions, layers, and/or sections, these elements, components, regions, layers, and/or sections should not be limited by these terms. These terms may be only used to distinguish one element, component, region, layer or section from another region, layer or section.

When an element or layer is referred to as being "on," "engaged to," "connected to," or "coupled to" another element or layer, it may be directly on, engaged, connected or coupled to the other element or layer, or intervening elements or layers may be present. The terms "connected" and "coupled" are not restricted to physical or mechanical connections or couplings, and can include electrical connections or couplings, whether direct or indirect.

The connection can be such that the objects are permanently connected or releasably connected.

It must be noted that as used herein and in the appended claims, the singular forms "a," "an," and "the" include the plural references unless the context clearly dictates otherwise.

It should be understood that the terms "comprises," "comprising," "includes," "including," "containing," "has," "having" or any other variation thereof specify the presence of stated features, integers, steps, operations, elements, and/or components, but do not preclude the presence or addition of one or more other features, integers, steps, operations, elements, and/or components.

A vehicle described in this specification refers to a car, an automobile, and the like. Hereinafter, the vehicle will be exemplified as a car.

The vehicle described in the specification may include, but is not limited to, a vehicle having an internal combustion engine as a power source, a hybrid vehicle having an engine and an electric motor as a power source, and an electric vehicle having an electric motor as a power source.

FIG. 1 is a diagram illustrating a vehicle to which a three-dimensional (3D) around view providing apparatus is applied according to an embodiment of the present disclosure.

Referring to FIG. 1, in a vehicle 1000 to which a 3D around view providing apparatus is applied, four camera modules, that is, a front camera module 1410a, both side-view mirror camera modules 1410b and 1410c, and a rear camera module 1410d (hereinafter, referred to as the camera modules 1410a, 1410b, 1410c, and 1410d) are installed.

According to embodiments, a vehicle to which the 3D around view providing apparatus is applied may include other components in addition to the camera modules 1410a, 1410b, 1410c, and 1410d that are illustrated in FIG. 1 and that will be described below, or may not include a portion of the camera modules 1410a, 1410b, 1410c, and 1410d that are illustrated in FIG. 1 and that will be described below.

A 3D around view providing apparatus according to an embodiment of the present disclosure may be mounted in the vehicle 1000 that includes a steering input device to adjust a wheel rotated by a power source and a direction of travel of the vehicle 1000. The vehicle 1000 may be capable of autonomous driving.

A 3D around view providing apparatus according to an embodiment of the present disclosure may be mounted in a user terminal that is possessed by a user having the vehicle 1000 and that communicates with the camera modules 1410a, 1410b, 1410c, and 1410d. The user terminal may be a portable device such as a laptop computer, a mobile phone, a personal digital assistant (PDA), a smart phone, and a multimedia device, or a non-portable device such as a personal computer (PC) or a vehicle-mounted device.

Figure 2:
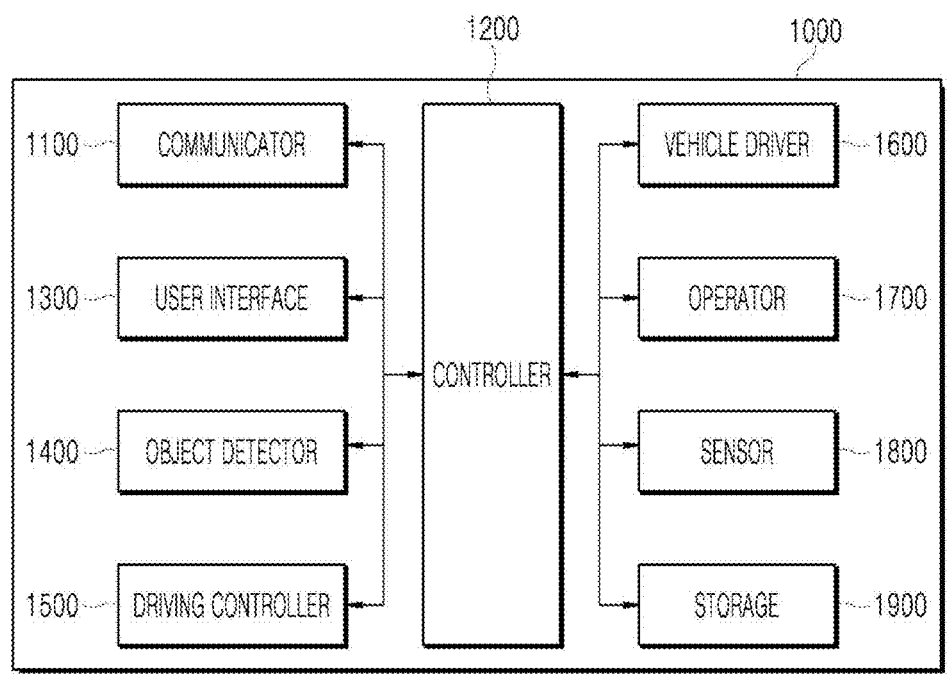
FIG. 2 is a block diagram illustrating a 3D around view providing apparatus installed in a vehicle according to an embodiment of the present disclosure.
Figure 3:
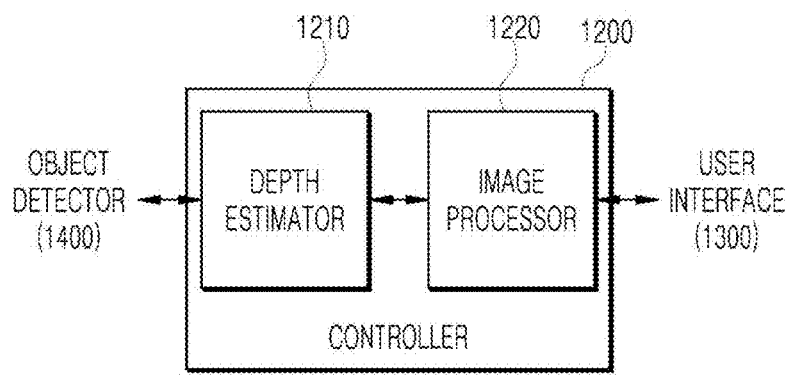
FIG. 3 is a block diagram illustrating a 3D around view providing apparatus according to an embodiment of the present disclosure.

FIGS. 2 and 3 are block diagrams illustrating 3D around view providing apparatuses according to an embodiment of the present disclosure.

Referring to FIG. 2, the 3D around view providing apparatus may include a communicator 1100, a controller 1200, a user interface 1300, an object detector 1400, a driving controller 1500, a vehicle driver 1600, an operator 1700, a sensor 1800, and a storage 1900.

According to embodiments, a system to which the 3D around view providing apparatus is applied may include other components in addition to components that are illustrated in FIGS. 2 and 3 and that will be described below, or may not include a portion of the components that are illustrated in FIGS. 2 and 3 and that will be described below.

A mode of the vehicle 1000 may be changed from an autonomous driving mode to a manual mode, or the manual mode to the autonomous driving mode, according a driving situation. Here, the driving situation may be determined by at least one among information received by the communicator 1100, external object information detected by the object detector 1400, and navigation information acquired by a navigation module.

The mode of the vehicle 1000 may be changed from the autonomous driving mode to the manual mode, or from the manual mode to the autonomous driving mode, according to a user input received through the user interface 1300.

When the vehicle 1000 is operated in the autonomous driving mode, the vehicle 1000 may be operated under the control of the operator 1700 that controls driving, parking, and unparking. When the vehicle 1000 is operated in the manual mode, the vehicle 1000 may be operated by an input through a mechanical driving operation of a driver.

The communicator 1100 may be a module for performing communication with an external device. Here, the external device may be a user terminal, another vehicle, or a server.

The communicator 1100 may receive deep neural network (DNN) data from the server based on downlink (DL) grant of a 5th-generation (5G) network.

The communicator 1100 may include at least one among a transmission antenna and a reception antenna that are used to perform communication, a Radio Frequency (RF) circuit capable of implementing various communication protocols, and an RF device.

The communicator 1100 may perform a short-range communication function, a function of receiving a global positioning system (GPS) signal, a vehicle-to-everything (V2X) communication function, an optical communication function, a function of transmitting and receiving broadcasting signals, and an intelligent transport systems (ITS) communication function.

According to embodiments, the communicator 1100 may further support other functions in addition to the aforementioned functions, or may not support a portion of the aforementioned functions.

The communicator 1100 may support short-range communication by using at least one among Bluetooth™, Radio Frequency Identification (RFID), Infrared Data Association (IrDA), Ultra WideBand (UWB), ZigBee, Near Field Communication (NFC), Wireless-Fidelity (Wi-Fi), Wi-Fi Direct, and Wireless Universal Serial Bus (Wireless USB) technologies.

The communicator 1100 may form short-range wireless communication networks so as to perform short-range communication between the vehicle 1000 and at least one external device.

The communicator 1100 may include a GPS module or a differential global positioning system (DGPS) module for obtaining location information of the vehicle 1000.

The communicator 1100 may include a module for supporting wireless communication between the vehicle 1000 and a server (V2I: vehicle to infrastructure), communication with another vehicle (V2V: vehicle to vehicle) or communication with a pedestrian (V2P: vehicle to pedestrian). That is, the communicator 1100 may include a V2X communication module. The V2X communication module may include an RF circuit capable of implementing V2I, V2V, and V2P communication protocols.

The communicator 1100 may receive a risk information broadcasting signal from another vehicle, may transmit a risk information query signal, and may receive risk information response signal in response to the risk information query signal, through the V2X communication module.

The communicator 1100 may include an optical communication module for performing communication with an external device via light. The optical communication module may include both a light transmitting module for converting electrical signals into optical signals and transmitting the optical signals to the outside, and a light receiving module for converting the received optical signals into electrical signals.

According to an embodiment, the light transmitting module may be integrally formed with a lamp included in the vehicle 1000.

The communicator 1100 may include a broadcast communication module for receiving broadcast signals from an external broadcast management server, or transmitting broadcast signals to the broadcast management server through broadcast channels. Examples of the broadcast channels may include a satellite channel and a terrestrial channel. Example of the broadcast signal may include a TV broadcast signal, a radio broadcast signal, and a data broadcast signal.

The communicator 1100 may include an ITS communication module that exchanges information, data or signals with a traffic system. The ITS communication module may provide the obtained information and data to the traffic system. The ITS communication module may receive information, data, or signals from the traffic system. For example, the ITS communication module may receive road traffic information from the communication system and provide the road traffic information to the controller 1200. For example, the ITS communication module may receive control signals from the traffic system and provide the control signals to the controller 1200 or a processor provided in the vehicle 1000.

Depending on the embodiment, the overall operation of each module of the communicator 1100 may be controlled by a separate process provided in the communicator 1100. The communicator 1100 may include a plurality of processors, or may not include a processor. When a processor is not included in the communicator 1100, the communicator 1100 may be operated by either a processor of another apparatus in the vehicle 1000 or the controller 1200.

The communicator 1100 may, together with the user interface 1300, implement a vehicle-use display device. In this case, the vehicle-use display device may be referred to as a telematics device or an audio video navigation (AVN) device.

Figure 4:
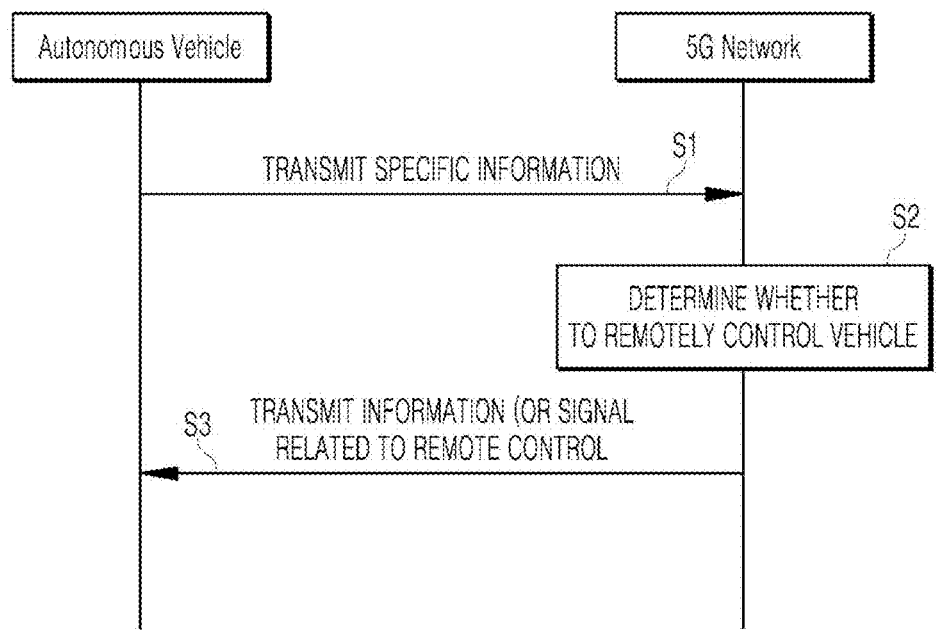
FIG. 4 is a diagram illustrating an example of a basic operation of a 5th-generation (5G) network and an autonomous vehicle in a 5G communication system.
Figure 5:
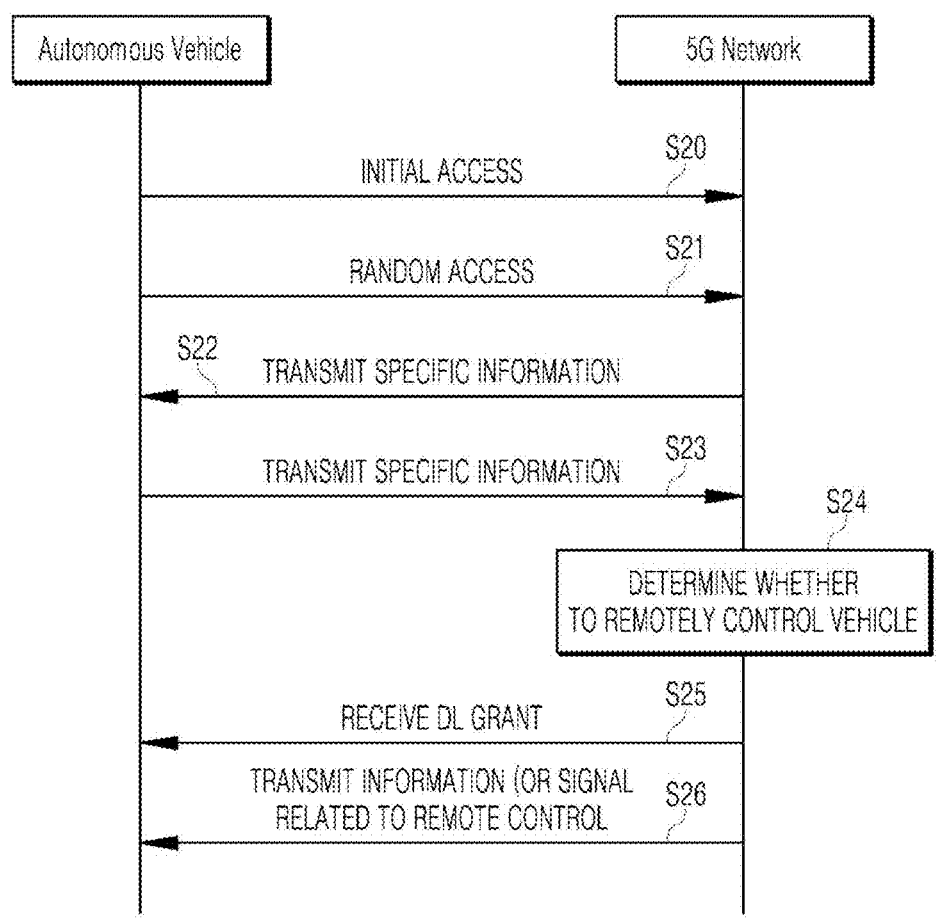
FIG. 5 is a diagram illustrating an example of an application operation of a 5G network and an autonomous vehicle in a 5G communication system.

FIG. 4 is a diagram illustrating an example of a basic operation of a 5G network and an autonomous vehicle in a 5G communication system.

The communicator 1100 may transmit specific information over a 5G network when the vehicle 1000 is operated in the autonomous driving mode (S1).

The specific information may include autonomous driving related information.

The autonomous driving related information may be information directly related to the driving control of the vehicle. For example, the autonomous driving related information may include at least one among object data indicating an object near the vehicle, map data, vehicle status data, vehicle location data, and driving plan data.

The autonomous driving related information may further include service information necessary for autonomous driving. For example, the specific information may include information on a destination inputted through the user terminal 1300 and a safety rating of the vehicle.

In addition, the 5G network may determine whether a vehicle is to be remotely controlled (S2).

The 5G network may include a server or a module for performing remote control related to autonomous driving.

The 5G network may transmit information (or a signal) related to the remote control to an autonomous vehicle (S3).

As described above, information related to the remote control may be a signal directly applied to the autonomous vehicle, and may further include service information necessary for autonomous driving. The autonomous vehicle according to this embodiment may receive service information such as insurance for each interval selected on a driving route and risk interval information, through a server connected to the 5G network to provide services related to the autonomous driving.

An essential process for performing 5G communication between the autonomous vehicle 1000 and the 5G network (for example, an initial access process between the vehicle 1000 and the 5G network) will be briefly described below with reference to FIG. 5 to FIG. 9.

An example of application operations through the autonomous vehicle 1000 performed in the 5G communication system and the 5G network is as follows.

The vehicle 1000 may perform an initial access process with the 5G network (initial access step, S20). The initial access process may include a cell search process for downlink (DL) synchronization acquisition and a process for obtaining system information.

The vehicle 1000 may perform a random access process with the 5G network (random access step, S21). The random access process may include a process for uplink (UL) synchronization acquisition or a preamble transmission process for UL data transmission, or a random access response receiving process.

The 5G network may transmit an Uplink (UL) grant for scheduling transmission of specific information to the autonomous vehicle 1000 (UL grant receiving step, S22).

The process in which the vehicle 1000 receives the UL grant may include a scheduling process for receiving a time/frequency source for the transmission of the UL data over the 5G network.

The autonomous vehicle 1000 may transmit specific information over the 5G network based on the UL grant (specific information transmission step, S23).

The 5G network may determine whether the vehicle 1000 is to be remotely controlled based on the specific information transmitted from the vehicle 1000 (vehicle remote control determination step, S24).

The autonomous vehicle 1000 may receive the DL grant through a physical DL control channel for receiving a response on pre-transmitted specific information from the 5G network (DL grant receiving step, S25).

The 5G network may transmit information (or a signal) related to the remote control to the autonomous vehicle 1000 based on the DL grant (remote control related information transmission step, S26).

A process in which the initial access process and/or the random access process between the 5G network and the autonomous vehicle 1000 is combined with the DL grant receiving process has been exemplified. However, the present disclosure is not limited thereto.

For example, the initial access process and/or the random access process may be performed through the initial access step, the UL grant receiving step, the specific information transmission step, the vehicle remote control determination step, and the remote control related information transmission step. In addition, for example, the initial access process and/or the random access process may be performed through the random access step, the UL grant receiving step, the specific information transmission step, the vehicle remote control determination step, and the remote control related information transmission step. The autonomous vehicle 1000 may be controlled by the combination of an AI operation and the DL grant receiving process through the specific information transmission step, the vehicle remote control determination step, the DL grant receiving step, and the remote control related information transmission step.

The operation of the autonomous vehicle 1000 described above is merely exemplary, but the present disclosure is not limited thereto.

For example, the operation of the autonomous vehicle 1000 may be performed by selectively combining the initial access step, the random access step, the UL grant receiving step, or the DL grant receiving step with the specific information transmission step, or the remote control related information transmission step. The operation of the autonomous vehicle 1000 may include the random access step, the UL grant receiving step, the specific information transmission step, and the remote control related information transmission step. The operation of the autonomous vehicle 1000 may include the initial access step, the random access step, the specific information transmission step, and the remote control related information transmission step. The operation of the autonomous vehicle 1000 may include the UL grant receiving step, the specific information transmission step, the DL grant receiving step, and the remote control related information transmission step.

Figure 6:
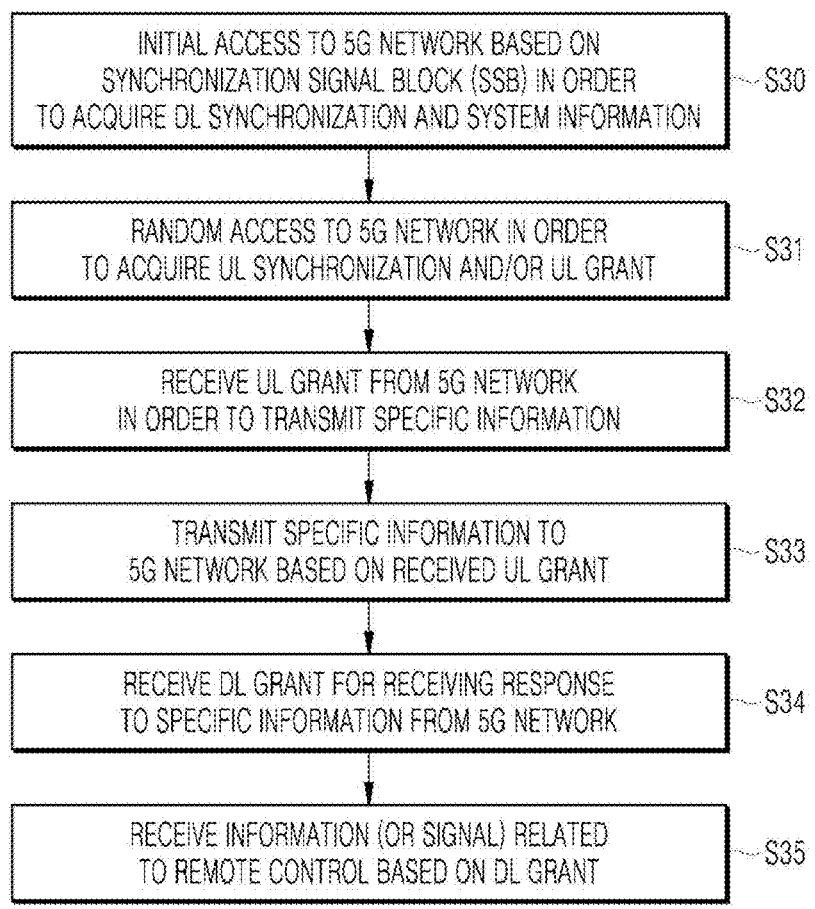
FIGS. 6 through 9 are diagrams illustrating an example of an operation of an autonomous vehicle using 5G communication.

As illustrated in FIG. 6, the vehicle 1000 including an autonomous driving module may perform an initial access process with the 5G network based on Synchronization Signal Block (SSB) in order to acquire DL synchronization and system information (initial access step, S30).

The autonomous vehicle 1000 may perform a random access process with the 5G network for UL synchronization acquisition and/or UL transmission (random access step, S31).

The autonomous vehicle 1000 may receive the UL grant from the 5G network for transmitting specific information (UL grant receiving step, S32).

The autonomous vehicle 1000 may transmit the specific information to the 5G network based on the UL grant (specific information transmission step, S33).

The autonomous vehicle 1000 may receive the DL grant from the 5G network for receiving a response to the specific information (DL grant receiving step, S34).

The autonomous vehicle 1000 may receive remote control related information (or a signal) from the 5G network based on the DL grant (remote control related information receiving step, S35).

A beam management (BM) process may be added to the initial access step, and a beam failure recovery process associated with Physical Random Access Channel (PRACH) transmission may be added to the random access step. QCL (Quasi Co-Located) relation may be added with respect to the beam reception direction of a Physical Downlink Control Channel (PDCCH) including the UL grant in the UL grant receiving step, and QCL relation may be added with respect to the beam transmission direction of the Physical Uplink Control Channel (PUCCH)/Physical Uplink Shared Channel (PUSCH) including specific information in the specific information transmission step. In addition, QCL relation may be added with respect to the beam reception direction of the PDCCH including the DL grant in the DL grant receiving step.

Figure 7:
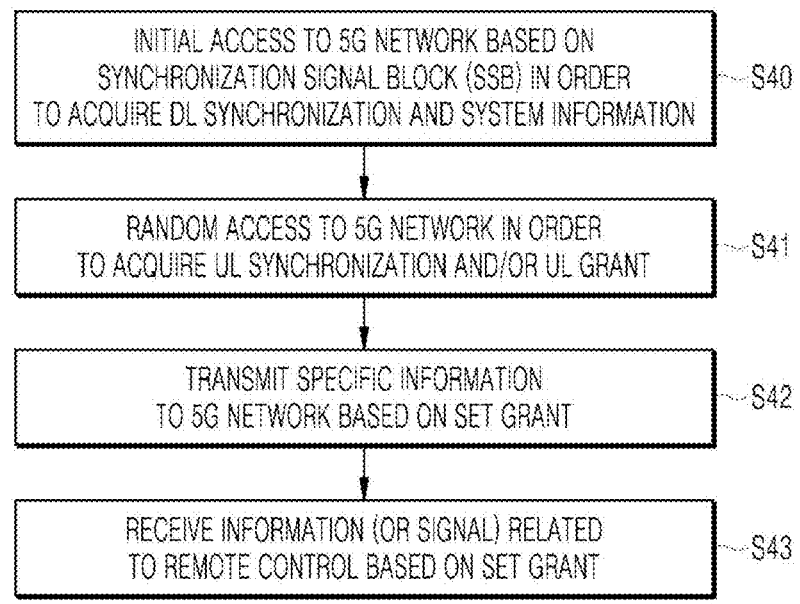

As illustrated in FIG. 7, the autonomous vehicle 1000 may perform an initial access process with the 5G network based on SSB for acquiring DL synchronization and system information (initial access step, S40).

The autonomous vehicle 1000 may perform a random access process with the 5G network for UL synchronization acquisition and/or UL transmission (random access step, S41).

The autonomous vehicle 1000 may transmit specific information based on a configured grant to the 5G network (UL grant receiving step, S42). In other words, the autonomous vehicle 1000 may receive the configured grant instead of receiving the UL grant from the 5G network.

The autonomous vehicle 1000 may receive the remote control related information (or a signal) from the 5G network based on the configured grant (remote control related information receiving step, S43).

Figure 8:
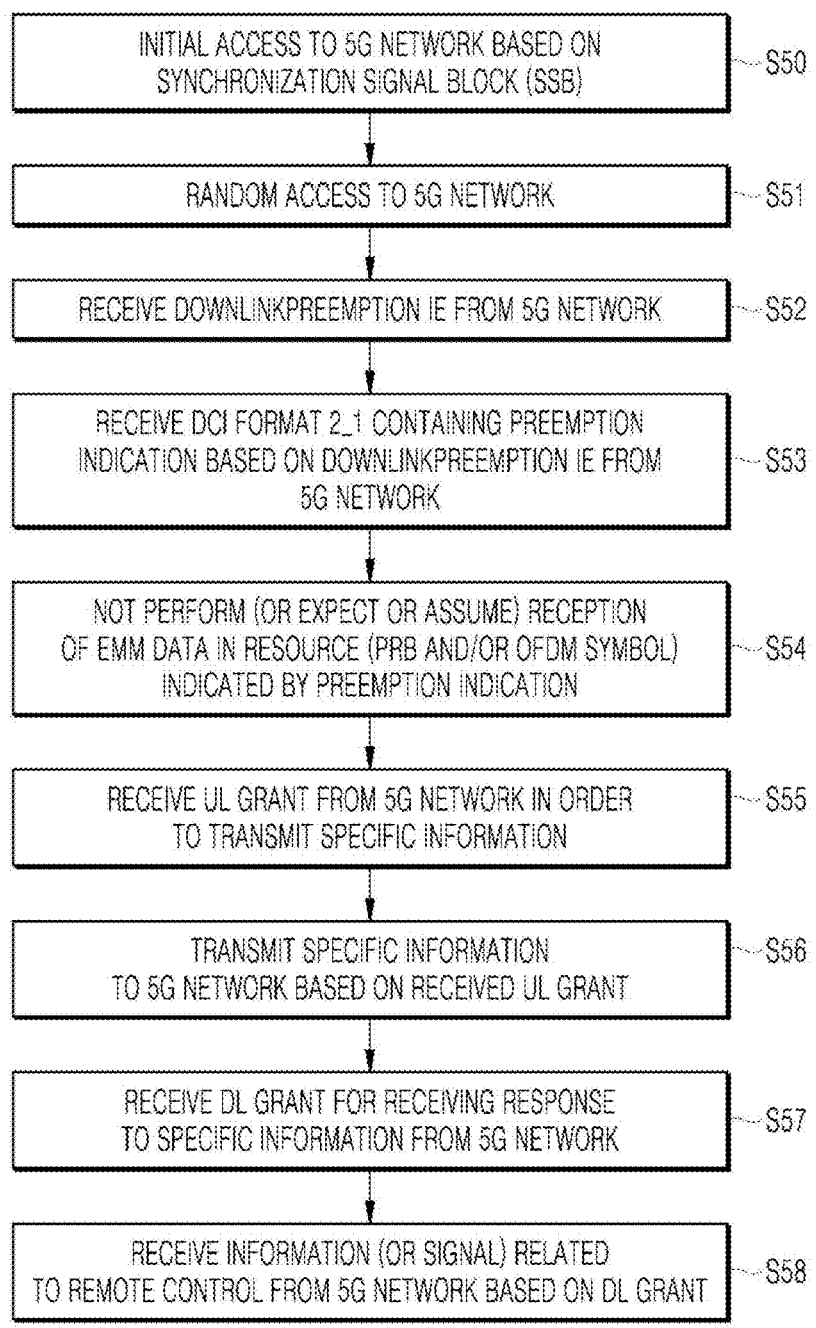

As illustrated in FIG. 8, the autonomous vehicle 1000 may perform an initial access process with the 5G network based on the SSB for acquiring the DL synchronization and the system information (initial access step, S50).

The autonomous vehicle 1000 may perform a random access process with the 5G network for UL synchronization acquisition and/or UL transmission (random access step, S51).

In addition, the autonomous vehicle 1000 may receive Downlink Preemption (DL) and Information Element (IE) from the 5G network (DL Preemption IE reception step, S52).

The autonomous vehicle 1000 may receive DCI (Downlink Control Information) format 2_1 including preemption indication based on the DL preemption IE from the 5G network (DCI format 2_1 receiving step, S53).

The autonomous vehicle 1000 may not perform (or expect or assume) the reception of eMBB data in the resource (PRB and/or OFDM symbol) indicated by the pre-emption indication (step of not receiving eMBB data, S54).

The autonomous vehicle 1000 may receive the UL grant over the 5G network for transmitting specific information (UL grant receiving step, S55).

The autonomous vehicle 1000 may transmit the specific information to the 5G network based on the UL grant (specific information transmission step, S56).

The autonomous vehicle 1000 may receive the DL grant from the 5G network for receiving a response to the specific information (DL grant receiving step, S57).

The autonomous vehicle 1000 may receive the remote control related information (or signal) from the 5G network based on the DL grant (remote control related information receiving step, S58).

Figure 9:
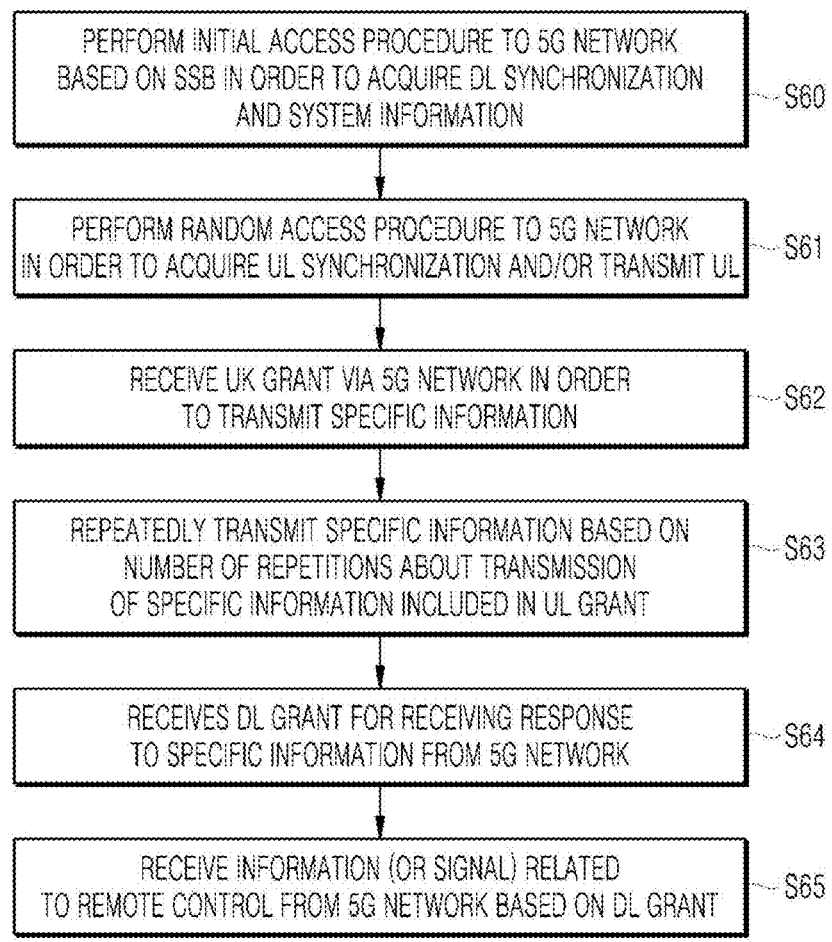

As illustrated in FIG. 9, the autonomous vehicle 1000 may perform an initial access process with the 5G network based on SSB for acquiring DL synchronization and system information (initial access step, S60).

The autonomous vehicle 1000 may perform a random access process with the 5G network for UL synchronization acquisition and/or UL transmission (random access step, S61).

The autonomous vehicle 1000 may receive the UL grant over the 5G network for transmitting specific information (UL grant receiving step, S62).

When specific information is transmitted repeatedly, the UL grant may include information on the number of repetitions, and the specific information may be repeatedly transmitted based on information on the number of repetitions (specific information repetition transmission step, S63).

The autonomous vehicle 1000 may transmit the specific information to the 5G network based on the UL grant.

The repeated transmission of the specific information may be performed by frequency hopping, and the first transmission of the specific information may be performed from a first frequency source, and the second transmission of the specific information may be performed from a second frequency source.

The specific information may be transmitted through Narrowband of Resource Block (6RB) and Resource Block (1RB).

The autonomous vehicle 1000 may receive the DL grant from the 5G network for receiving a response to the specific information (DL grant receiving step, S64).

The autonomous vehicle 1000 may receive the remote control related information (or signal) from the 5G network based on the DL grant (remote control related information receiving step, S65).

The above-described 5G communication technique can be applied in combination with the embodiment proposed in this specification, which will be described in FIG. 1 to FIG. 14, or supplemented to specify or clarify the technical feature of the embodiment proposed in this specification.

The vehicle 1000 may be connected to an external server through a communication network, and may be capable of moving along a predetermined route without a driver's intervention by using an autonomous driving technique.

In the embodiment described below, a user may be interpreted as a driver, a passenger, or an owner of a user terminal.

While the vehicle 1000 is driving in the autonomous driving mode, the type and frequency of accident occurrence may depend on the capability of the vehicle 1000 of sensing dangerous elements in the vicinity in real time. The route to the destination may include intervals with different levels of risk based on various causes, such as weather, terrain characteristic, and traffic congestion.

At least one among an autonomous vehicle, a user terminal, and a server according to embodiments of the present disclosure may be associated or integrated with an artificial intelligence module, a drone (unmanned aerial vehicle (UAV)), a robot, an augmented reality (AR) device, a virtual reality (VR) device, a 5G service related device, and the like.

For example, the vehicle 1000 may operate in association with at least one artificial intelligence module or robot included in the vehicle 1000 in the autonomous driving mode.

For example, the vehicle 1000 may interact with at least one robot. The robot may be an autonomous mobile robot (AMR) capable of driving by itself. Being capable of driving by itself, the AMR may freely move, and may include a plurality of sensors so as to avoid obstacles during traveling. The AMR may be a flying robot (such as a drone) equipped with a flight device.

The AMR may be a wheel-type robot equipped with at least one wheel, and which is moved through the rotation of the at least one wheel. The AMR may be a leg-type robot equipped with at least one leg, and which is moved using the at least one leg.

The robot may function as a device that enhances the convenience of a user of a vehicle. For example, the robot may move a load placed in the vehicle 1000 to a final destination. For example, the robot may perform a function of providing route guidance to a final destination to a user who alights from the vehicle 1000. For example, the robot may perform a function of transporting the user who alights from the vehicle 1000 to the final destination At least one electronic apparatus included in the vehicle 1000 may communicate with the robot through a communication device.

At least one electronic apparatus included in the vehicle 1000 may provide, to the robot, data processed by the at least one electronic apparatus included in the vehicle 1000. For example, at least one electronic apparatus included in the vehicle 1000 may provide, to the robot, at least one among object data indicating an object near the vehicle, HD map data, vehicle status data, vehicle position data, and driving plan data.

At least one electronic apparatus included in the vehicle 1000 may receive, from the robot, data processed by the robot. At least one electronic apparatus included in the vehicle 1000 may receive at least one among sensing data sensed by the robot, object data, robot status data, robot location data, and robot movement plan data.

At least one electronic apparatus included in the vehicle 1000 may generate a control signal based on data received from the robot. For example, at least one electronic apparatus included in the vehicle may compare information on the object generated by an object detection device with information on the object generated by the robot, and generate a control signal based on the comparison result. At least one electronic apparatus included in the vehicle 1000 may generate a control signal so that interference between the vehicle movement route and the robot movement route may not occur.

At least one electronic apparatus included in the vehicle 1000 may include a software module or a hardware module for implementing an artificial intelligence (AI) (hereinafter referred to as an artificial intelligence module). At least one electronic apparatus included in the vehicle 1000 may input obtained data into the artificial intelligence module, and use data outputted from the artificial intelligence module.

The artificial intelligence module may perform machine learning of input data by using at least one artificial neural network (ANN). The artificial intelligence module may output driving plan data through machine learning of input data.

At least one electronic apparatus included in the vehicle 1000 may generate a control signal based on the data outputted from the artificial intelligence module.

According to the embodiment, at least one electronic apparatus included in the vehicle 1000 may receive data processed by an artificial intelligence from an external device through a communication device. At least one electronic apparatus included in the vehicle may generate a control signal based on the data processed by the artificial intelligence.

The controller 1200 may include a depth estimator 1210, and an image processor 1220.

The depth estimator 1210 may receive four images from a plurality of image pickup units, for example, the camera modules 1410a, 1410b, 1410c, and 1410d, and may acquire four depth maps corresponding to the four images.

The depth estimator 1210 may input a plurality of images to a DNN encoder, and may acquire a plurality of depth maps corresponding to the plurality of images. That is, the depth estimator 1210 may acquire the four depth maps from the four images by using a deep learning-based two-dimensional (2D)-3D conversion algorithm.

The depth estimator 1210 may acquire a depth map of each image by applying a monocular depth estimation method that uses deep learning. The monocular depth estimation method applicable to an embodiment of the present disclosure is disclosed in "Unsupervised Monocular Depth Estimation with Left-Right Consistency", CVPR 2007, and the like, but is not limited thereto.

The depth estimator 1210 may update the DNN encoder based on DNN data that is received through the communicator 1100.

Artificial intelligence (AI) is an area of computer engineering science and information technology that studies methods to make computers mimic intelligent human behaviors such as reasoning, learning, self-improving, and the like.

Also, AI does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed.

More specifically, machine learning is a technology that investigates and builds systems, and algorithms for such systems, that are capable of learning, making predictions, and enhancing its own performance on the basis of experiential data. Machine learning algorithms, rather than only executing rigidly set static program commands, may be used to take an approach that builds models for deriving predictions and decisions from inputted data.

Numerous machine learning algorithms have been developed for data classification in machine learning. Representative examples of such machine learning algorithms for data classification include a decision tree, a Bayesian network, a support vector machine (SVM), an artificial neural network (ANN), and so forth.

Decision tree refers to an analysis method that uses a tree-like graph or model of decision rules to perform classification and prediction.

Bayesian network may include a model that represents the probabilistic relationship (conditional independence) among a set of variables. Bayesian network may be appropriate for data mining via unsupervised learning.

SVM may include a supervised learning model for pattern detection and data analysis, heavily used in classification and regression analysis.

ANN is a data processing system modelled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

ANNs may refer generally to models that have artificial neurons (nodes) forming a network through synaptic interconnections, and acquires problem-solving capability as the strengths of synaptic interconnections are adjusted throughout training.

The terms 'artificial neural network' and 'neural network' may be used interchangeably herein.

An ANN may include a number of layers, each including a number of neurons. Furthermore, the ANN may include synapses that connect the neurons to one another.

An ANN may be defined by the following three factors: (1) a connection pattern between neurons on different layers; (2) a learning process that updates synaptic weights; and (3) an activation function generating an output value from a weighted sum of inputs received from a previous layer.

ANNs include, but are not limited to, network models such as a deep neural network (DNN), a recurrent neural network (RNN), a bidirectional recurrent deep neural network (BRDNN), a multilayer perception (MLP), and a convolutional neural network (CNN).

An ANN may be classified as a single-layer neural network or a multi-layer neural network, based on the number of layers therein.

In general, a single-layer neural network may include an input layer and an output layer.

In general, a multi-layer neural network may include an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron can be activated and output an output value obtained through an activation function.

A deep neural network with a plurality of hidden layers between the input layer and the output layer may be the most representative type of artificial neural network which enables deep learning, which is one machine learning technique.

An ANN can be trained using training data. Here, the training may refer to the process of determining parameters of the artificial neural network by using the training data, to perform tasks such as classification, regression analysis, and clustering of inputted data. Such parameters of the artificial neural network may include synaptic weights and biases applied to neurons.

An artificial neural network trained using training data can classify or cluster inputted data according to a pattern within the inputted data.

Throughout the present specification, an artificial neural network trained using training data may be referred to as a trained model.

Hereinbelow, learning paradigms of an artificial neural network will be described in detail.

Learning paradigms, in which an artificial neural network operates, may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an artificial neural network can be trained with training data that has been given a label.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

Throughout the present specification, assigning one or more labels to training data in order to train an artificial neural network may be referred to as labeling the training data with labeling data.

Training data and labels corresponding to the training data together may form a single training set, and as such, they may be inputted to an artificial neural network as a training set.

The training data may exhibit a number of features, and the training data being labeled with the labels may be interpreted as the features exhibited by the training data being labeled with the labels. In this case, the training data may represent a feature of an input object as a vector.

Using training data and labeling data together, the artificial neural network may derive a correlation function between the training data and the labeling data. Then, through evaluation of the function derived from the artificial neural network, a parameter of the artificial neural network may be determined (optimized).

Unsupervised learning is a machine learning method that learns from training data that has not been given a label.

More specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

Examples of artificial neural networks using unsupervised learning include, but are not limited to, a generative adversarial network (GAN) and an autoencoder (AE).

GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One semi-supervised learning technique involves reasoning the label of unlabeled training data, and then using this reasoned label for learning. This technique may be used advantageously when the cost associated with the labeling process is high.

Reinforcement learning may be based on a theory that given the condition under which a reinforcement learning agent can determine what action to choose at each time instance, the agent can find an optimal path to a solution solely based on experience without reference to data.

Reinforcement learning may be performed mainly through a Markov decision process.

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An artificial neural network is characterized by features of its model, the features including an activation function, a loss function or cost function, a learning algorithm, an optimization algorithm, and so forth. Also, the hyperparameters are set before learning, and model parameters can be set through learning to specify the architecture of the artificial neural network.

For instance, the structure of an artificial neural network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size, and may also include methods that increase optimization accuracy in SGD by adjusting the momentum and step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof. Therefore, in order to obtain a good learning model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters can be set to optimal values that provide a stable learning rate and accuracy.

The image processor 1220 may minimize a depth difference between a first boundary region of a first depth map and a second boundary region of a second depth map, may acquire an around view depth map with the minimized depth difference between the first boundary region and the second boundary region, and may restore a 3D around view image for the plurality of images by using the around view depth map. The first depth map and the second depth map may be adjacent to each other among the plurality of depth maps, and the first boundary region and the second boundary region may be boundary regions in which the first depth map and the second depth map overlap.

The image processor 1220 may minimize a depth difference between a third boundary region of a third depth map and a fourth boundary region of the first depth map, may acquire an around view depth map with the minimized depth difference between the first boundary region and the second boundary region and the minimized depth difference between the third boundary region and the fourth boundary region, and may restore a 3D around view image for the plurality of images by using the around view depth map. The third boundary region and the fourth boundary region may be boundary regions in which the third depth map and the first depth map among the plurality of depth maps overlap. Here, one side of the first depth map may overlap the second depth map, and the other side of the first depth map may overlap the third depth map.

The image processor 1220 may determine the first boundary region and the second boundary region in which the first depth map and the second depth map overlap, based on locations in which the plurality of image pickup units is mounted. That is, the image processor 1220 may determine a boundary region between an image acquired by the camera module 1410*b* and an image acquired by the camera module 1410*a*, a boundary region between an image acquired by the camera module 1410*a* and an image acquired by the camera module 1410*c*, a boundary region between an image acquired by the camera module 1410*c* and an image acquired by the camera module 1410*d*, or a boundary region between an image acquired by the camera module 1410*d* and an image acquired by the camera module 1410*b*, based on locations in which the camera modules 1410*a*, 1410*b*, 1410*c*, and 1410*d* are mounted.

The image processor 1220 may minimize the depth difference between the first boundary region and the second boundary region by using a function that minimizes a Euclidean distance between first boundary region 3D coordinate values calculated by a depth value in the first boundary region and second boundary region 3D coordinate values calculated by a depth value in the second boundary region.

The image processor 1220 may calculate a first linear function that minimizes a Euclidean distance between first boundary region 3D coordinate values calculated by a depth value in the first boundary region and second boundary region 3D coordinate values calculated by a depth value in the second boundary region, and a second linear function that minimizes a Euclidean distance between third boundary region 3D coordinate values calculated by a depth value in the third boundary region and fourth boundary region 3D coordinate values calculated by a depth value in the fourth boundary region, and may minimize the depth difference between the first boundary region and the second boundary region and the depth difference between the third boundary region and the fourth boundary region by using a final linear function having a coefficient and a constant which are respectively equal to an average of coefficients of the first linear function and the second linear function and an average of constants of the first linear function and the second linear function.

The image processor 1220 may convert a 2D depth value provided from the depth estimator 1210 to 3D coordinates, and a conversion method is described in detail below.

The image processor 1220 may receive a 2D depth value 2D depth from the depth estimator 1210 in the form of a depth value corresponding to 2D coordinate values 2D.x and 2D.y, as shown below.

2Ddepth(2D.x,2D.y,depth)

The image processor 1220 may convert the 2D depth value 2D depth to 3D coordinates 3D point by using internal parameters of the camera modules 1410a, 1410b, 1410c, and 1410d, as shown below.

The image processor 1220 may obtain a 3D x-coordinate value 3D.X by substituting a 2D x-coordinate value 2D.x and a corresponding depth value depth into Equation 1 shown below.

$$3D \cdot X = \frac{(2D \cdot x - cx)\text{depth}}{fx} \quad \text{[Equation 1]}$$

Here, for 3D conversion, the image processor 1220 may use, as coefficients, an inverse number of a focal length fx on an x-axis of each of the camera modules 1410a, 1410b, 1410c, and 1410d, and a principal point cx on the x-axis among the internal parameters of the camera modules 1410a, 1410b, 1410c, and 1410d.

The image processor 1220 may obtain a 3D y-coordinate value 3D.Y by substituting a 2D y-coordinate value 2D.y and a corresponding depth value depth into Equation 2 shown below.

$$3D \cdot Y = \frac{(2D \cdot y - cy)\text{depth}}{fy} \quad \text{[Equation 2]}$$

Here, for 3D conversion, the image processor 1220 may use, as coefficients, an inverse number of a focal length fy on a y-axis of each of the camera modules 1410a, 1410b, 1410c, and 1410d and a principal point cy on the y-axis among the internal parameters of the camera modules 1410a, 1410b, 1410c, ands 1410d.

The image processor 1220 may use a depth value depth as a 3D z-coordinate value 3D.Z, as shown in Equation 3 below.

$$3D.Z = \text{depth} \quad \text{[Equation 3]}$$

The image processor 1220 may set first boundary region 3D coordinate values to correspond to a focal length and a principal point of a camera module based on a depth value in the first boundary region and first boundary region 2D coordinate values by applying the same method as that described above.

That is, the image processor 1220 may set the camera modules 1410a, 1410b, 1410c, and 1410d as cameras #1, #2, #3, and #4, respectively, and may convert 2D coordinate values 2D.x_i and 2D.y_i and a depth value depth_i of a boundary region of each of the camera modules 1410a, 1410b, 1410c, and 1410d to 3D coordinates (3D.X_i, 3D.Y_i, 3D.Z_i).

$$(3D \cdot X_i, 3D \cdot Y_i, 3D \cdot Z_i) = \quad \text{[Equation 4]}$$
$$\left( \frac{(2D \cdot x_i - cx_i)\text{depth}_i}{fx_i}, \frac{(2D \cdot y_i - cy_i)\text{depth}_i}{fy_i}, \text{depth}_i \right)$$

Here, i denotes camera numbers 1 to 4.

The image processor 1220 may transform the origin of 3D coordinates from each of the camera modules 1410a, 1410b, 1410c, and 1410d to a center of a vehicle. Here, 3D translation and 3D rotation may be applied. Here, a method used in the 3D translation and the 3D rotation is disclosed in "Mathematics for Computer Graphics", John Vince, and the like, but is not limited thereto.

The image processor 1220 may use a determinant shown below for 3D translation (x, y, z→x', y'z')

$$\begin{bmatrix} x' \\ y' \\ z' \\ 1 \end{bmatrix} = \begin{bmatrix} 1 & 0 & 0 & t_x \\ 0 & 1 & 0 & t_y \\ 0 & 0 & 1 & t_z \\ 0 & 0 & 0 & 1 \end{bmatrix} \begin{bmatrix} x \\ y \\ z \\ 1 \end{bmatrix} \quad \text{[Equation 5]}$$

The image processor 1220 may use a determinant shown below to perform 3D rotation (x, y, z→x', y' z') based on a z axis.

$$\begin{bmatrix} x' \\ y' \\ z' \\ 1 \end{bmatrix} = \begin{bmatrix} \cos\beta & -\sin\beta & 0 & 0 \\ \sin\beta & \cos\beta & 0 & 0 \\ 0 & 0 & 1 & 0 \\ 0 & 0 & 0 & 1 \end{bmatrix} \begin{bmatrix} x \\ y \\ z \\ 1 \end{bmatrix} \quad \text{[Equation 6]}$$

The image processor 1220 may use a determinant shown below to perform 3D rotation (x, y, z→x', y' z') based on an x axis.

$$\begin{bmatrix} x' \\ y' \\ z' \\ 1 \end{bmatrix} = \begin{bmatrix} 1 & 0 & 0 & 0 \\ 0 & \cos\beta & -\sin\beta & 0 \\ 0 & \sin\beta & \cos\beta & 0 \\ 0 & 0 & 0 & 1 \end{bmatrix} \begin{bmatrix} x \\ y \\ z \\ 1 \end{bmatrix} \quad \text{[Equation 7]}$$

The image processor 1220 may use a determinant shown below to perform 3D rotation (x, y, z→x', y' z') based on a y axis.

$$\begin{bmatrix} x' \\ y' \\ z' \\ 1 \end{bmatrix} = \begin{bmatrix} \cos\beta & 0 & \sin\beta & 0 \\ 0 & 1 & 0 & 0 \\ -\sin\beta & 0 & \cos\beta & 0 \\ 0 & 0 & 0 & 1 \end{bmatrix} \begin{bmatrix} x \\ y \\ z \\ 1 \end{bmatrix} \quad \text{[Equation 8]}$$

The image processor 1220 may calculate 3D coordinates ($3D.X_{1_{trans}}$, $3D.Y_{1_{trans}}$, $3D.Z_{1_{trans}}$) of which the origin is transformed to the center of the vehicle by using translation and rotation, as described above. The calculated 3D coordinates may include a camera parameter, a translation parameter, and a rotation parameter which are constants, and a depth value depth_i that is a variable.

The depth estimator 1210 may acquire a first depth map ($2D.x_1$, $2D.y_1$, $depth_1$) by using an image acquired through the camera module 1410a, acquire a second depth map ($2D.x_2$, $2D.y_2$, $depth_2$) by using the camera module 1410b, and acquire a third depth map ($2D.x_3$, $2D.y_3$, $depth_3$) by using the camera module 1410c, in the same manner as described above.

The image processor 1220 may convert the first depth map ($2D.x_1$, $2D.y_1$, $depth_1$), the second depth map ($2D.x_2$, 2D.y$_2$, depth$_2$), and the third depth map (2D.x$_3$, 2D.y$_3$, depth$_3$) to 3D coordinates by Equation 4 described above, and may transform the origin of coordinates to the center of the vehicle, to generate 3D-transformed coordinates (3D.X$_{1_{trans}}$, 3D.Y$_{1_{trans}}$, 3D.Z$_{1_{trans}}$) of the first depth map, 3D-transformed coordinates (3D.X$_{2_{trans}}$, 3D.Y$_{2_{trans}}$, 3D.Z$_{2_{trans}}$) of the second depth map, and 3D-transformed coordinates (3D.X$_{3_{trans}}$, 3D.Y$_{3_{trans}}$, 3D.Z$_{3_{trans}}$) of the third depth map.

The image processor 1220 may calculate a first linear function that minimizes a Euclidean distance between a first boundary region of 3D coordinates (3D.X$_{1_{trans}}$, 3D.Y$_{1_{trans}}$, 3D.Z$_{1_{trans}}$) calculated by the first depth map and 3D coordinates (3D.X$_{2_{trans}}$, 3D.Y$_{2_{trans}}$, 3D.Z$_{2_{trans}}$) calculated by the second depth map which overlaps the first boundary region. That is, since a variable determining each 3D coordinate value is a depth value depth_i, the image processor 1220 may set the depth value depth_i as shown in Equation 9 below.

$$depth_1 = \alpha_{21} depth_2 + \beta_{21} \quad \text{[Equation 9]}$$

That is, according to Equation 9, the image processor 1220 may calculate the first linear function by substituting a linear function $\alpha depth_2 + \beta$, instead of the depth value depth_1 that is a variable of the 3D coordinates (3D.X$_{1_{trans}}$, 3D.Y$_{1_{trans}}$, 3D.Z$_{1_{trans}}$) of the first boundary region, and by obtaining $\alpha_{21}$ and $\beta_{21}$ that minimize a Euclidean distance between the 3D coordinates (3D.X$_{1_{trans}}$, 3D.Y$_{1_{trans}}$, 3D.Z$_{1_{trans}}$) of the first boundary region and the 3D coordinates (3D.X$_{2_{trans}}$, 3D.Y$_{2_{trans}}$, 3D.Z$_{2_{trans}}$) which overlap the first boundary region.

The image processor 1220 may calculate a second linear function that minimizes a Euclidean distance between a third boundary region of the 3D coordinates (3D.X$_{1_{trans}}$, 3D.Y$_{1_{trans}}$, 3D.Z$_{1_{trans}}$) calculated by the first depth map and 3D coordinates (3D.X$_{3_{trans}}$, 3D.Y$_{3_{trans}}$, 3D.Z$_{3_{trans}}$) calculated by the third depth map which overlaps the third boundary region. That is, the image processor 1220 may set as shown in Equation 10 below similar to Equation 9.

$$depth_1 = \alpha_{31} depth_3 + \beta_{31} \quad \text{[Equation 10]}$$

That is, according to Equation 10, the image processor 1220 may calculate the second linear function by substituting a linear function $\alpha depth_3 + \beta$, instead of the depth value depth_1 that is a variable of the 3D coordinates (3D.X$_{1_{trans}}$, 3D.Y$_{1_{trans}}$, 3D.Z$_{1_{trans}}$) of the third boundary region, and by obtaining $\alpha_{21}$ and $\beta_{21}$ that minimize a Euclidean distance between the 3D coordinates (3D.X$_{1_{trans}}$, 3D.Y$_{1_{trans}}$, 3D.Z$_{1_{trans}}$) of the third boundary region and the 3D coordinates (3D.X$_{3_{trans}}$, 3D.Y$_{3_{trans}}$, 3D.Z$_{3_{trans}}$) of the fourth boundary region which overlaps the third boundary region.

The image processor 1220 may calculate a final linear function that obtains a corrected depth value which is to be applied to coordinates for correction of a boundary region by reflecting all the coefficient $\alpha_{21}$ and constant $\beta_{21}$ of the first linear function, and the coefficient $\alpha_{31}$ and $\beta_{31}$ constant of the second linear function which are calculated as described above.

For example, the image processor 1220 may calculate the final linear function as shown below, by applying 50% of the coefficient $\alpha_{21}$ and constant $\beta_{21}$ of the first linear function, and 50% of the coefficient $\alpha_{31}$ and constant $\beta_{31}$ of the second linear function.

$$depth_1 = \frac{\alpha_{21} + \alpha_{31}}{2} depth_1 + \frac{\beta_{21} + \beta_{31}}{2} \quad \text{[Equation 11]}$$

The image processor 1220 may acquire an around view image with a naturally corrected boundary region by substituting a right side of the above final linear function into the variable depth_1 of the 3D coordinates (3D.X$_{1_{trans}}$, 3D.Y$_{1_{trans}}$, 3D.Z$_{1_{trans}}$).

The vehicle controller 1200 may be implemented using at least one among application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and other electronic units for performing other functions.

The user interface 1300 may allow interaction between the vehicle 1000 and a user of the vehicle 1000, may receive an input signal of the user, may transmit the received input signal to the controller 1200, and may provide information included in the vehicle 1000 to the user under the control of the controller 1200. The user interface 1300 may include an input module, an internal camera, a bio-sensing module, and an output module, but is not limited thereto.

The input module may be configured to receive, as an input, information from a user, and data collected by the input module may be analyzed by the controller 1200 and may be processed to be a control command of a user.

The input module may receive, as an input, a destination of the vehicle 1000 from a user, and may provide the destination to the controller 1200.

The input module may input, to the controller 1200, a signal to designate and deactivate at least one among a plurality of sensor modules of the object detector 1400 according to a user's input.

The input module may be disposed inside a vehicle. For example, the input module 1310 may be disposed in one area of a steering wheel, one area of an instrument panel, one area of a seat, one area of each pillar, one area of a door, one area of a center console, one area of a head lining, one area of a sun visor, one area of a windshield, or one area of a window.

The output module may be configured to generate an output related to sight, hearing, or touch. The output module may output a sound or an image.

The output module may include at least one among a display module, a sound output module, and a haptic output module.

The display module may receive a 3D around view image from the image processor 1200, and may display the 3D around view image in the form of a screen that allows a user to recognize.

The display module may display graphic objects corresponding to a variety of information.

The display module may include at least one among a liquid crystal display (LCD), a thin film transistor liquid crystal display (TFT LCD), an organic light-emitting diode (OLED), a flexible display, a 3D display, and an e-ink display.

The display module may form an inter-layer structure with a touch input module, or may be integrally formed with the touch input module, to implement a touch screen.

The display module may be implemented as a head-up display (HUD). When the display module is implemented as a HUD, the display module may include a project module, and output information through an image projected onto a windshield or a window.

The display module may include a transparent display. The transparent display may be attached to a window shield or a window.

The transparent display may display a predetermined screen with a predetermined transparency. In order to be transparent, the transparent display may include, for example, at least one among a transparent thin film electroluminescent (TFEL), a transparent OLED, a transparent LCD, a transmissive transparent display, and a transparent light emitting diode (LED). The transparency of the transparent display may be adjusted.

The user interface 1300 may include a plurality of display modules.

The display module may be disposed in one area of the steering wheel, one area of the instrument panel, one area of the seat, one area of each pillar, one area of the door, one area of the center console, one area of the head lining, or one area of the sun visor, or may be implemented on one area of the windshield or one area of the window.

The sound output module may convert an electrical signal provided from the controller 1200 into an audio signal, and may output the audio signal. The sound output module may include at least one speaker.

The haptic output module may generate a tactile output. For example, the haptic output module may operate to vibrate a steering wheel, a seatbelt, and a seat so that the user may recognize an output.

The object detector 1400 may be configured to detect an object located outside the vehicle 1000, may generate object information based on sensing data, and may transfer the generated object information to the controller 1200. Examples of the object may include various objects related to the driving of the vehicle 1000, such as a lane, another vehicle, a pedestrian, a motorcycle, a traffic signal, light, a road, a structure, a speed bump, a landmark, and an animal.

The object detector 1400 may include, as a plurality of sensor modules, the camera modules 1410*a*, 1410*b*, 1410*c*, and 1410*d* as a plurality of image pickup units, a light detection and ranging (lidar), an ultrasonic sensor, a radio detection and ranging (radar) 1450, and an infrared sensor.

The object detector 1400 may sense, using the plurality of sensor modules, surrounding environment information of the vehicle 1000.

According to embodiments, the object detector 1400 may further include other components in addition to the aforementioned components, or may not include a portion of the aforementioned components.

The radar may include an electromagnetic wave transmitting module and an electromagnetic wave receiving module. The radar may be implemented using a pulse radar method or a continuous wave radar method in terms of radio wave emission principle. The radar may be implemented using a frequency modulated continuous wave (FMCW) method or a frequency shift keying (FSK) method according to a signal waveform in a continuous wave radar method.

The radar may detect an object based on a time-of-flight (TOF) method or a phase-shift method using an electromagnetic wave as a medium, and detect the location of the detected object, the distance to the detected object, and the relative speed of the detected object.

The radar may be disposed at an appropriate position outside the vehicle for sensing an object disposed at the front, back, or side of the vehicle.

The lidar may include a laser transmitting module, and a laser receiving module. The lidar may be embodied using the time of flight (TOF) method or in the phase-shift method.

The lidar may be implemented using a driving method or a non-driving method.

When the lidar is embodied in the driving method, the lidar may rotate by means of a motor, and detect an object near the vehicle 1000. When the lidar is implemented in the non-driving method, the lidar may detect an object within a predetermined range with respect to the vehicle 1000 by means of light steering. The vehicle 1000 may include a plurality of non-drive type lidars.

The lidar may detect an object using the TOF method or the phase-shift method using laser light as a medium, and detect the location of the detected object, the distance from the detected object and the relative speed of the detected object.

The lidar may be disposed at an appropriate position outside the vehicle for sensing an object disposed at the front, back, or side of the vehicle.

An image pickup unit may be located at an appropriate place outside the vehicle, for example, the front, the rear, a right side-view mirror, and a left side-view mirror of the vehicle, in order to acquire images of the outside of the vehicle. The image pickup unit may be a mono camera, but is not limited thereto, and may be a stereo camera, an around view monitoring (AVM) camera, or a 360-degree camera.

The image pickup unit may be disposed near a front windshield in the vehicle in order to acquire images of the front of the vehicle. Alternatively, the image pickup unit may be disposed around a front bumper or a radiator grille.

The image pickup unit may be disposed near a rear glass in the vehicle in order to acquire images of the rear of the vehicle. Alternatively, the image pickup unit may be disposed around a rear bumper, a trunk, or a tailgate.

The image pickup unit may be disposed near at least one of side windows in the vehicle in order to acquire images of the side of the vehicle. In addition, the image pickup unit may be disposed around a fender, or a door.

The image pickup unit may provide an acquired image to the depth estimator 1210 of the controller 1200.

The ultrasonic sensor may include an ultrasonic transmitting module, and an ultrasonic receiving module. The ultrasonic sensor may detect an object based on ultrasonic waves, and detect the location of the detected object, the distance from the detected object, and the relative speed of the detected object.

The ultrasonic sensor may be disposed at an appropriate position outside the vehicle for sensing an object at the front, back, or side of the vehicle.

The infrared sensor may include an infrared transmitting module, and an infrared receiving module. The infrared sensor may detect an object based on infrared light, and detect the location of the detected object, the distance from the detected object, and the relative speed of the detected object.

The infrared sensor may be disposed at an appropriate position outside the vehicle for sensing an object at the front, back, or side of the vehicle.

The controller 1200 may control an overall operation of each module of the object detector 1400.

The controller 1200 may detect or classify an object by comparing data sensed by a radar, a lidar, an ultrasonic sensor and an infrared sensor with prestored data.

The controller 1200 may detect and track an object based on an acquired image. The controller 1200 may perform an operation, for example, calculation of a distance to an object, calculation of a speed relative to an object, and the like, through an image processing algorithm.

For example, the controller 1200 may acquire information about a distance to an object, and information about a speed relative to the object from an acquired image, based on a change in a size of the object over time.

For example, the controller 1200 may acquire information about a distance to an object, and information about a speed relative to the object through a pin hole model, or by profiling a road surface.

The controller 1200 may detect and track an object based on a reflection electromagnetic wave which is formed as a result of reflection of a transmitted electromagnetic wave by the object. Based on the electromagnetic wave, the controller 1200 may perform an operation, for example, calculation of a distance to an object, calculation of a speed relative to an object, and the like.

The controller 1200 may detect and track an object based on reflection laser light which is formed as a result of reflection of transmitted laser light by the object. Based on the laser light, the controller 1200 may perform an operation, for example, calculation of a distance to an object, calculation of a speed relative to an object, and the like.

The controller 1200 may detect and track an object based on a reflection ultrasonic wave which is formed as a result of reflection of a transmitted ultrasonic wave by the object. Based on the ultrasonic wave, the controller 1200 may perform an operation, for example, calculation of a distance to an object, calculation of a speed relative to an object, and the like.

The controller 1200 may detect and track an object based on reflection infrared light which is formed as a result of reflection of transmitted infrared light by the object. Based on the infrared light, the controller 1200 may perform an operation, for example, calculation of a distance to an object, calculation of a speed relative to an object, and the like.

According to embodiments, the object detector 1400 may include a processor independently of the controller 1200. In addition, the radar, the lidar, the ultrasonic sensor, and the infrared sensor may each include a processor.

When a processor is included in the object detector 1400, the object detector 1400 may operate under the control of the processor controlled by the controller 1200.

The driving controller 1500 may receive a user input for driving. In the case of the manual mode, the vehicle 1000 may operate based on a signal provided by the driving controller 1500.

The vehicle driver 1600 may electrically control the driving of various apparatuses in the vehicle 1000. The vehicle driver 1600 may electrically control driving of a power train, a chassis, a door/window, a safety device, a lamp, and an air conditioner in the vehicle 1000.

The operator 1700 may control various operations of the vehicle 1000. The operator 1700 may be operated in the autonomous driving mode.

The operator 1700 may include a driving module, an unparking module, and a parking module.

According to embodiments, the operator 1700 may further include other components in addition to the aforementioned components, or may not include a portion of the aforementioned components.

The operator 1700 may include a processor controlled by the controller 1200. Each module of the operator 1700 may include a processor individually.

According to embodiments, in the case in which the operator 1700 is implemented as software, the operator 1700 may be subordinate to the controller 1200.

The driving module may perform driving of the vehicle 1000.

The driving module may receive object information from the object detector 1400, and provide a control signal to a vehicle driving module, to perform the driving of the vehicle 1000.

The driving module may receive a signal from an external device through the communicator 1100, and may provide a control signal to the vehicle driving module, to perform driving of the vehicle 1000.

In the unparking module, unparking of the vehicle 1000 may be performed.

The unparking module may receive navigation information from the navigation module, and may provide a control signal to the vehicle driving module, to perform unparking of the vehicle 1000.

In the unparking module, object information may be received from the object detector 1400, and a control signal may be provided to the vehicle driving module, so that the parking of the vehicle 1000 may be performed.

In the unparking module, a signal may be provided from an external device through the communicator 1100, and a control signal may be provided to the vehicle driving module, so that the parking of the vehicle 1000 may be performed.

In the parking module, parking of the vehicle 1000 may be performed.

The parking module may receive navigation information from the navigation module, and may provide a control signal to the vehicle driving module, to perform parking of the vehicle 1000.

In the parking module, object information may be provided from the object detector 1400, and a control signal may be provided to the vehicle driving module, so that the parking of the vehicle 1000 may be performed.

In the parking module, a signal may be provided from the external device through the communicator 1100, and a control signal may be provided to the vehicle driving module so that the parking of the vehicle 1000 may be performed.

The navigation module may provide navigation information to the controller 1200. The navigation information may include at least one among map information, set destination information, route information according to destination setting, information on various objects on the route, lane information, and present location information of the vehicle.

The navigation module may provide the controller 1200 with a parking lot map of a parking lot which vehicle 1000 has entered. When the vehicle 1000 enters the parking lot, the controller 1200 may receive the parking lot map from the navigation module, and may generate map data by reflecting a calculated traveling route and fixed identification information to the provided parking lot.

The navigation module may include a memory. The memory may store navigation information. The navigation information may be updated by information received through the communicator 1100. The navigation module may be controlled by an internal processor, or may operate by receiving an external signal, for example, a control signal from the controller 1200, but the present disclosure is not limited thereto.

The driving module of the operator 1700 may receive navigation information from the navigation module, and may provide a control signal to the vehicle driving module, to perform driving of the vehicle 1000.

The sensor 1800 may sense the state of the vehicle 1000 using a sensor mounted on the vehicle 1000, that is, a signal related to the state of the vehicle 1000, and obtain movement route information of the vehicle 1000 according to the sensed signal. The sensor 1800 may provide the obtained movement route information to the controller 1200.

The sensor 1800 may include a posture sensor (for example, a yaw sensor, a roll sensor, and a pitch sensor), a collision sensor, a wheel sensor, a speed sensor, a tilt sensor, a weight sensor, a heading sensor, a gyro sensor, a position module, a vehicle forward/reverse movement sensor, a battery sensor, a fuel sensor, a tire sensor, a steering sensor by rotation of a steering wheel, a vehicle interior temperature sensor, a vehicle interior humidity sensor, an ultrasonic sensor, an illuminance sensor, an accelerator pedal position sensor, and a brake pedal position sensor, but is not limited thereto.

The sensor 1800 may acquire sensing signals for information such as vehicle posture information, vehicle collision information, vehicle direction information, vehicle position information (GPS information), vehicle angle information, vehicle speed information, vehicle acceleration information, vehicle tilt information, vehicle forward/reverse movement information, battery information, fuel information, tire information, vehicle lamp information, vehicle interior temperature information, vehicle interior humidity information, a steering wheel rotation angle, vehicle exterior illuminance, pressure on an acceleration pedal, and pressure on a brake pedal.

The sensor 1800 may further include an acceleration pedal sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), but is not limited thereto.

The sensor 1800 may generate vehicle status information based on sensing data. The vehicle status information may be information generated based on data sensed by various sensors included in the inside of the vehicle.

The vehicle status information may include at least one among posture information of the vehicle, speed information of the vehicle, tilt information of the vehicle, weight information of the vehicle, direction information of the vehicle, battery information of the vehicle, fuel information of the vehicle, tire air pressure information of the vehicle, steering information of the vehicle, vehicle interior temperature information, vehicle interior humidity information, pedal position information, and vehicle engine temperature information.

The storage 1900 may be electrically connected to the controller 1200. The storage 1900 may store basic data for each unit of the 3D around view providing apparatus, control data to control an operation of each unit of the 3D around view providing apparatus, and input and output data. The storage 1900 may be any of various hardware storage devices, such as a ROM, a RAM, an EPROM, a flash drive, and a hard drive. The storage 1900 may store a variety of data for the overall operation of the vehicle 1000, such as programs for the processing or control of the controller 1200, and store, in particular, driver tendency information. Here, the storage 1900 may be formed integrally with the controller 1200, or may be implemented as a sub-component of the controller 1200.

Figure 10:
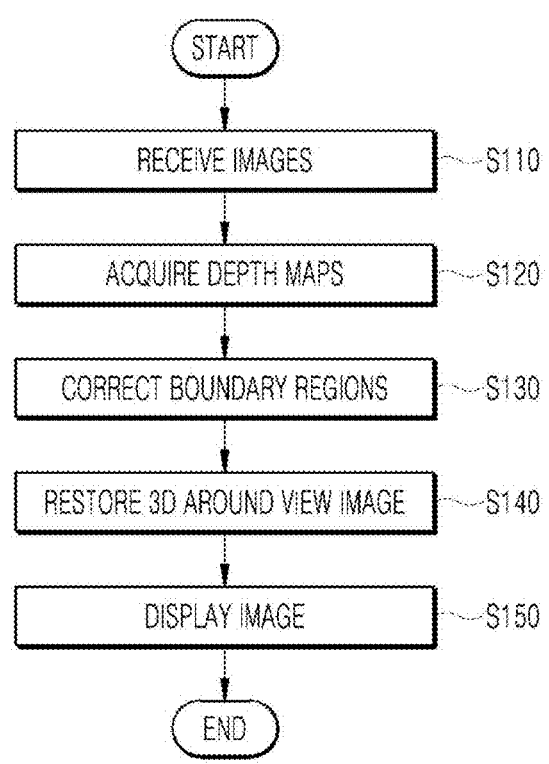
FIG. 10 is a flowchart illustrating a 3D around view providing method according to an embodiment of the present disclosure.

FIG. 10 is a flowchart illustrating a 3D around view providing method according to an embodiment of the present disclosure.

Figure 11:
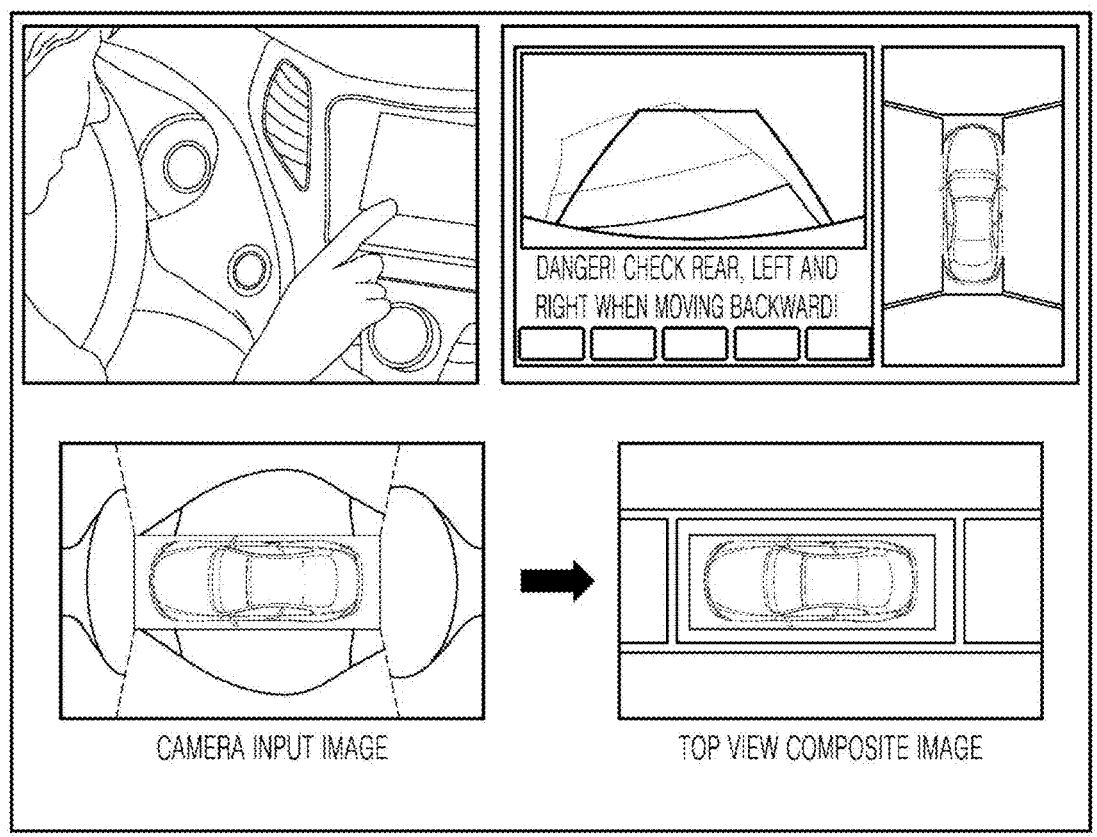
FIG. 11 is a diagram illustrating an interface of a 3D around view providing apparatus installed in a vehicle according to an embodiment of the present disclosure.

FIG. 11 is a diagram illustrating an interface of a 3D around view providing apparatus installed in a vehicle according to an embodiment of the present disclosure.

Figure 12:
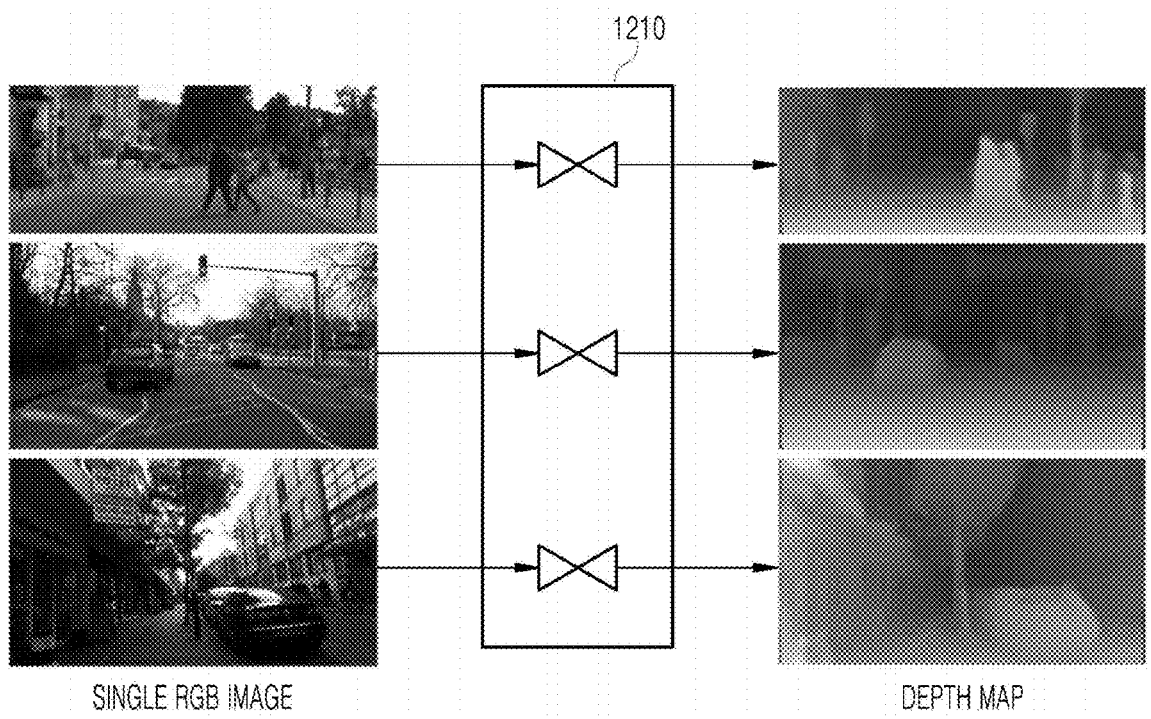
FIG. 12 is a diagram illustrating an operation of a depth estimator in a 3D around view providing method according to an embodiment of the present disclosure.

FIG. 12 is a diagram illustrating an operation of a depth estimator in a 3D around view providing method according to an embodiment of the present disclosure.

Figure 13:
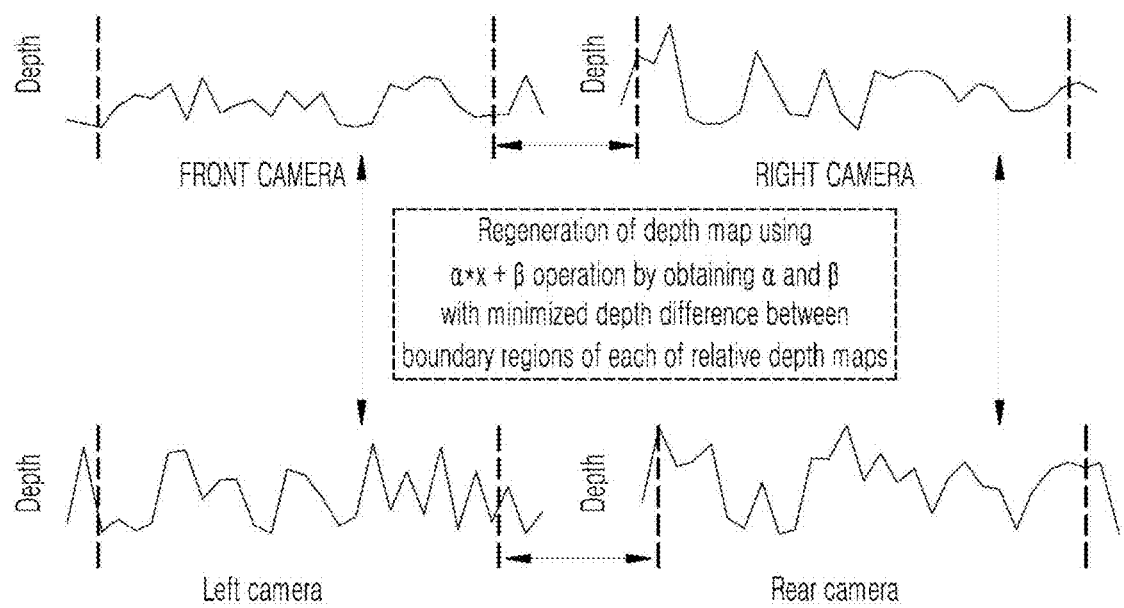
FIGS. 13 and 14 are diagrams illustrating an operation of an image processor in a 3D around view providing apparatus according to an embodiment of the present disclosure.
Figure 14:
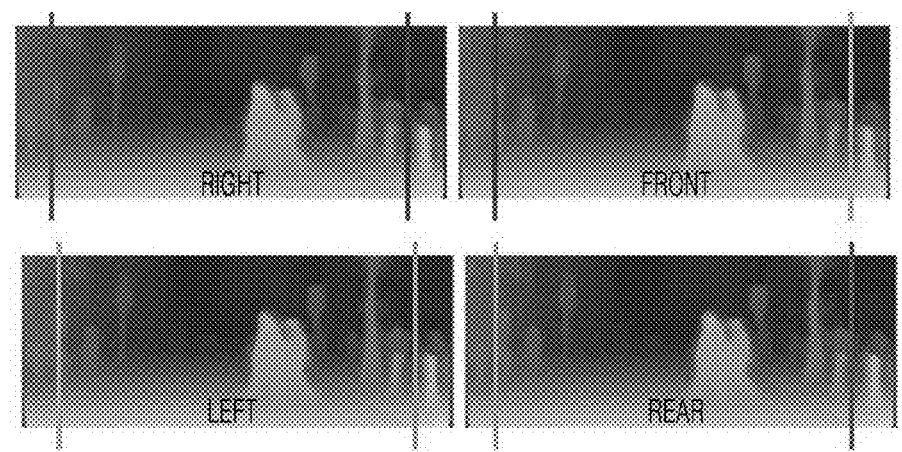

FIGS. 13 and 14 are diagrams illustrating an operation of an image processor in a 3D around view providing apparatus according to an embodiment of the present disclosure.

The 3D around view providing method may include other steps in addition to steps that are illustrated in FIGS. 10 through 14 and that will be described below, or may not include a portion of the steps that are illustrated in FIGS. 10 through 14 and that will be described below.

First, a plurality of images may be received through the camera modules 1410a, 1410b, 1410c, and 1410d as a plurality of image pickup units (S110).

The depth estimator 1210 may acquire a plurality of depth maps corresponding to the plurality of images (S120).

The image processor 1220 may minimize a depth difference between a first boundary region of a first depth map and a second boundary region of a second depth map, and may acquire an around view depth map with the minimized depth difference between the first boundary region and the second boundary region (S130). The first depth map and the second depth map may be adjacent to each other among the plurality of depth maps, and the first boundary region and the second boundary region may be boundary regions in which the first depth map and the second depth map overlap.

The image processor 1220 may restore a 3D around view image for the plurality of images by using the around view depth map (S140).

The user interface 1300 may output the restored 3D around view image in the form of a screen that allows a user to recognize (S150).

Referring to FIG. 11, it may be found that a boundary of each of images (camera input images) inputted through the camera modules 1410a, 1410b, 1410c, and 1410d is significantly distorted before the images are corrected to a top view image (top view composite image).

The depth estimator 1210 may receive, as inputs, a plurality of single RGB images through the camera modules 1410a, 1410b, 1410c, and 1410d, may input the plurality of single RGB images to a DNN encoder, and may acquire a plurality of depth maps corresponding to the plurality of single RGB images, as illustrated in FIG. 12.

The image processor 1220 may correct depth values of the plurality of acquired depth maps such that boundaries of four images are naturally recognized with user's eyes, and may use corrected depth maps to generate an around view image.

The image processor 1220 may minimize a depth difference between boundary regions of respective depth maps acquired from images of the camera modules 1410a, 1410b, 1410c, and 1410d, in order to compensate for a characteristic that each of the depth maps has a relative depth value, as illustrated in FIGS. 13 and 14.

For example, the image processor 1220 may calculate, with respect to all four depth maps, a linear function for adjusting a depth value in a depth map acquired from an image of the camera module 1410a, as shown in Equation 11, and may update a depth value of each of the depth maps by the calculated linear function.

Depth values that may be applied to the camera modules 1410b, 1410c, and 1410d may be adjusted as shown in Equation 12 below.

$$depth_2 = \frac{\alpha_{12} + \alpha_{42}}{2} depth_2 + \frac{\beta_{12} + \beta_{42}}{2} \qquad \text{[Equation 12]}$$

$$depth_3 = \frac{\alpha_{13} + \alpha_{43}}{2} depth_3 + \frac{\beta_{13} + \beta_{43}}{2}$$

$$depth_4 = \frac{\alpha_{24} + \alpha_{34}}{2} depth_4 + \frac{\beta_{24} + \beta_{34}}{2}$$

Here, numbers 1 to 4 indicated in variables depth, coefficients α, and constants β denote camera numbers.

The present disclosure described above may be implemented as a computer-readable code in a medium on which a program is recorded. The computer readable medium includes all types of recording devices in which data readable by a computer system readable can be stored. Examples of the computer readable medium include a hard disk drive (HDD), a solid state disk (SSD), a silicon disk drive (SDD), a read-only memory (ROM), a random-access memory (RAM), CD-ROM, a magnetic tape, a floppy disk, an optical data storage device, and the like, and it may also be implemented in the form of a carrier wave (for example, transmission over the Internet). In addition, the computer may include a processor or a controller. Therefore, the above description should not be construed as limiting and should be considered illustrative. The scope of the present disclosure should be determined by rational interpretation of the appended claims, and all changes within the scope of equivalents of the present disclosure are included in the scope of the present disclosure.

What is claimed is:

1. A three-dimensional (3D) around view providing apparatus for providing a 3D around view through a user interface module included in a vehicle, the 3D around view providing apparatus comprising:
    at least one processor configured to:
    receive a plurality of images from a plurality of image pickup units mounted in the vehicle and to acquire a plurality of depth maps corresponding to the plurality of images;
    minimize a depth difference between a first boundary region of a first depth map and a second boundary region of a second depth map, to acquire a first around view depth map with the minimized depth difference between the first boundary region and the second boundary region, and to restore a 3D around view image for the plurality of images by using the first around view depth map, the first boundary region and the second boundary region being boundary regions in which the first depth map and the second depth map, which are adjacent to each other among the plurality of depth maps, overlap; and
    display the 3D around view image.

2. The 3D around view providing apparatus according to claim 1, wherein the at least one processor is further configured to
    acquire the plurality of depth maps corresponding to the plurality of images by inputting the plurality of images to a deep neural network (DNN) encoder.

3. The 3D around view providing apparatus according to claim 1, wherein the at least one processor is further configured to
    determine the first boundary region and the second boundary region in which the first depth map and the second depth map overlap, based on locations in which the plurality of image pickup units is mounted.

4. The 3D around view providing apparatus according to claim 1, wherein the at least one processor is further configured to
    minimize the depth difference between the first boundary region and the second boundary region by using a function that minimizes a Euclidean distance between first boundary region 3D coordinate values calculated by a depth value in the first boundary region and second boundary region 3D coordinate values calculated by a depth value in the second boundary region.

5. The 3D around view providing apparatus according to claim 4, wherein
    the first boundary region 3D coordinate values are 3D coordinate values set to correspond to a focal length and a principal point of each of the image pickup units, based on the depth value in the first boundary region and first boundary region two-dimensional (2D) coordinate values, and
    the second boundary region 3D coordinate values are 3D coordinate values set to correspond to a focal length and a principal point of each of the image pickup units, based on the depth value in the second boundary region and second boundary region 2D coordinate values.

6. The 3D around view providing apparatus according to claim 1, wherein the at least one processor is further configured to
    minimize a depth difference between a third boundary region of a third depth map and a fourth boundary region of the first depth map, acquires a second around view depth map with the minimized depth difference between the first boundary region and the second boundary region and the minimized depth difference between the third boundary region and the fourth boundary region, and restores a 3D around view image for the plurality of images by using the second around view depth map, wherein the third boundary region and the fourth boundary region are boundary regions in which the third depth map and the first depth map among the plurality of depth maps overlap, and
    one side of the first depth map overlaps the second depth map, and the other side of the first depth map overlaps the third depth map.

7. The 3D around view providing apparatus according to claim 6, wherein the at least one processor is further configured to
    calculate a first linear function that minimizes a Euclidean distance between first boundary region 3D coordinate values calculated by a depth value in the first boundary region and second boundary region 3D coordinate values calculated by a depth value in the second boundary region, and a second linear function that minimizes a Euclidean distance between third boundary region 3D coordinate values calculated by a depth value in the third boundary region and fourth boundary region 3D coordinate values calculated by a depth value in the fourth boundary region, and minimizes the depth difference between the first boundary region and the second boundary region and the depth difference between the third boundary region and the fourth boundary region by using a final linear function having a coefficient and a constant which are respectively equal to an average of coefficients of the first linear function and the second linear function and an average of constants of the first linear function and the second linear function.

8. The 3D around view providing apparatus according to claim 7, wherein
    the first boundary region 3D coordinate values are 3D coordinate values set to correspond to a focal length and a principal point of each of the image pickup units, based on the depth value in the first boundary region and first boundary region 2D coordinate values,
    the second boundary region 3D coordinate values are 3D coordinate values set to correspond to a focal length and a principal point of each of the image pickup units, based on the depth value in the second boundary region and second boundary region 2D coordinate values, the third boundary region 3D coordinate values are 3D coordinate values set to correspond to a focal length and a principal point of each of the image pickup units, based on the depth value in the third boundary region and third boundary region 2D coordinate values, and the fourth boundary region 3D coordinate values are 3D coordinate values set to correspond to a focal length and a principal point of each of the image pickup units, based on the depth value in the fourth boundary region and fourth boundary region 2D coordinate values.

9. The 3D around view providing apparatus according to claim 2, wherein the at least one processor is further configured to control an operation of an autonomous driving mode of the vehicle; and receive DNN data based on a downlink (DL) grant of a 5th-generation (5G) network connected to allow the vehicle to operate in the autonomous driving mode, wherein the at least one processor is further configured to update the DNN encoder based on the DNN data.

10. A three-dimensional (3D) around view providing method of providing a 3D around view through a user interface module included in a vehicle, the 3D around view providing method comprising:

receiving a plurality of images through an image pickup unit;

acquiring a plurality of depth maps corresponding to the plurality of images;

minimizing a depth difference between a first boundary region of a first depth map and a second boundary region of a second depth map, the first boundary region and the second boundary region being boundary regions in which the first depth map and the second depth map, which are adjacent to each other among the plurality of depth maps, overlap;

acquiring a first around view depth map with the minimized depth difference between the first boundary region and the second boundary region;

restoring a 3D around view image for the plurality of images by using the first around view depth map; and displaying the 3D around view image.

11. The 3D around view providing method according to claim 10, wherein the acquiring the plurality of depth maps comprises acquiring the plurality of depth maps corresponding to the plurality of images by inputting the plurality of images to a deep neural network (DNN) encoder.

12. The 3D around view providing method according to claim 10, wherein the minimizing the depth difference between the first boundary region and the second boundary region comprises determining the first boundary region and the second boundary region in which the first depth map and the second depth map overlap, based on a location where the image pickup unit is mounted in the vehicle.

13. The 3D around view providing method according to claim 10, wherein the minimizing the depth difference between the first boundary region and the second boundary region comprises minimizing the depth difference between the first boundary region and the second boundary region by using a function that minimizes a Euclidean distance between first boundary region 3D coordinate values calculated by a depth value in the first boundary region and second boundary region 3D coordinate values calculated by a depth value in the second boundary region.

14. The 3D around view providing method according to claim 13, wherein the first boundary region 3D coordinate values are 3D coordinate values set to correspond to a focal length and a principal point of the image pickup unit, based on the depth value in the first boundary region and first boundary region two-dimensional (2D) coordinate values, and the second boundary region 3D coordinate values are 3D coordinate values set to correspond to the focal length and the principal point of the image pickup unit, based on the depth value in the second boundary region and second boundary region 2D coordinate values.

15. The 3D around view providing method according to claim 10, wherein the minimizing the depth difference between the first boundary region and the second boundary region comprises minimizing a depth difference between a third boundary region of a third depth map and a fourth boundary region of the first depth map, the third boundary region and the fourth boundary region being boundary regions in which the third depth map and the first depth map among the plurality of depth maps overlap, the acquiring the first around view depth map comprises acquiring a second around view depth map with the minimized depth difference between the first boundary region and the second boundary region and the minimized depth difference between the third boundary region and the fourth boundary region, and one side of the first depth map overlaps the second depth map, and the other side of the first depth map overlaps the third depth map.

16. The 3D around view providing method according to claim 15, wherein the minimizing the depth difference between the third boundary region and the fourth boundary region comprises:

calculating a first linear function that minimizes a Euclidean distance between first boundary region 3D coordinate values calculated by a depth value in the first boundary region and second boundary region 3D coordinate values calculated by a depth value in the second boundary region, and a second linear function that minimizes a Euclidean distance between third boundary region 3D coordinate values calculated by a depth value in the third boundary region and fourth boundary region 3D coordinate values calculated by a depth value in the fourth boundary region; and minimizing the depth difference between the first boundary region and the second boundary region and the depth difference between the third boundary region and the fourth boundary region by using a final linear function having a coefficient and a constant which are respectively equal to an average of coefficients of the first linear function and the second linear function and an average of constants of the first linear function and the second linear function.

17. The 3D around view providing method according to claim 16, wherein the first boundary region 3D coordinate values are 3D coordinate values set to correspond to a focal length and a principal point of the image pickup unit, based on the depth value in the first boundary region and first boundary region 2D coordinate values, the second boundary region 3D coordinate values are 3D coordinate values set to correspond to a focal length and a principal point of the image pickup unit, based on the depth value in the second boundary region and second boundary region 2D coordinate values, the third boundary region 3D coordinate values are 3D coordinate values set to correspond to a focal length and a principal point of the image pickup unit, based on the depth value in the third boundary region and third boundary region 2D coordinate values, and the fourth boundary region 3D coordinate values are 3D coordinate values set to correspond to a focal length and a principal point of the image pickup unit, based on the depth value in the fourth boundary region and fourth boundary region 2D coordinate values.

18. A non-transitory computer-readable recording medium storing instructions that, when executed by at least one processor, cause performance of operations comprising:

receiving a plurality of images through an image pickup unit;

acquiring a plurality of depth maps corresponding to the plurality of images;

minimizing a depth difference between a first boundary region of a first depth map and a second boundary region of a second depth map, the first boundary region and the second boundary region being boundary regions in which the first depth map and the second depth map, which are adjacent to each other among the plurality of depth maps, overlap;

acquiring an around view depth map with the minimized depth difference between the first boundary region and the second boundary region;

restoring a 3D around view image for the plurality of images by using the around view depth map; and displaying the 3D around view image.

* * * * *